US011390823B2

(12) United States Patent
Hayashi et al.

(10) Patent No.: US 11,390,823 B2
(45) Date of Patent: *Jul. 19, 2022

(54) BIOMASS SOLID FUEL

(71) Applicant: UBE INDUSTRIES, LTD., Ube (JP)

(72) Inventors: Shigeya Hayashi, Ube (JP); Hiroshi Amano, Ube (JP); Nobuyuki Ooi, Ube (JP); Yuusuke Hiraiwa, Ube (JP)

(73) Assignee: Ube Industries, Ltd., Ube (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/090,473

(22) PCT Filed: Apr. 3, 2017

(86) PCT No.: PCT/JP2017/013990
§ 371 (c)(1),
(2) Date: Oct. 1, 2018

(87) PCT Pub. No.: WO2017/175733
PCT Pub. Date: Oct. 12, 2017

(65) Prior Publication Data

US 2019/0119593 A1 Apr. 25, 2019

(30) Foreign Application Priority Data

Apr. 6, 2016 (JP) .............................. JP2016-076441

(51) Int. Cl.
*C10L 5/36* (2006.01)
*C10L 5/44* (2006.01)
(Continued)

(52) U.S. Cl.
CPC ................ *C10L 5/442* (2013.01); *C10L 5/08* (2013.01); *C10L 5/28* (2013.01); *C10L 5/363* (2013.01);
(Continued)

(58) Field of Classification Search
CPC ......... C10L 2200/0469; C10L 2290/30; C10L 5/361; C10L 5/363; C10L 5/44; C10L 5/442; C10L 5/447
See application file for complete search history.

(56) References Cited

U.S. PATENT DOCUMENTS 7,932,065 B2 * 4/2011 Medoff ................. D21C 9/007
435/165
7,942,942 B2 * 5/2011 Paoluccio ............... C10L 9/083
44/605
(Continued)

FOREIGN PATENT DOCUMENTS

CA 2885804 A1 4/2014
CA 2896771 A1 6/2014
(Continued)

OTHER PUBLICATIONS

Kim, Young-Hun, Optimal condition of Torrefaction for high energy density solid fuel of fast growing tree species, 2015, Korean J. Chem Eng 32(8) 1547-1553 (Year: 2015).*

(Continued)

*Primary Examiner* — Ellen M Mcavoy
*Assistant Examiner* — Ming Cheung Po
(74) *Attorney, Agent, or Firm* — Knobbe Martens Olson & Bear LLP

(57) ABSTRACT

A biomass solid fuel which, when exposed to rain water, has a reduced COD in discharged water and has low disintegration-property, while suppressing an increase in cost. The biomass solid fuel obtained by molding pulverized biomass particles, such that mutual bonding or adhesion between pulverized biomass particles is maintained after immersion in water.

14 Claims, 7 Drawing Sheets

(51) Int. Cl.
  C10L 9/08 (2006.01)
  C10L 5/08 (2006.01)
  C10L 5/28 (2006.01)
(52) U.S. Cl.
  CPC .............. *C10L 5/445* (2013.01); *C10L 9/08* (2013.01); *C10L 2200/0469* (2013.01); *C10L 2290/06* (2013.01); *C10L 2290/08* (2013.01); *C10L 2290/28* (2013.01); *C10L 2290/32* (2013.01); *Y02E 50/10* (2013.01); *Y02E 50/30* (2013.01)

(56) References Cited

U.S. PATENT DOCUMENTS

| | | | |
|---|---|---|---|
| 10,287,730 | B2 | 5/2019 | Medoff |
| 2007/0266623 | A1 | 11/2007 | Paoluccio |
| 2008/0051614 | A1 | 2/2008 | Iida et al. |
| 2010/0031560 | A1* | 2/2010 | Calabrese ............... C01B 3/02 44/550 |
| 2011/0179701 | A1 | 7/2011 | Grassi |
| 2013/0312472 | A1* | 11/2013 | Brehmer ................ C10B 57/02 71/24 |
| 2015/0259616 | A1 | 9/2015 | Ono et al. |
| 2015/0315505 | A1 | 11/2015 | Hayashi et al. |
| 2017/0218290 | A1* | 8/2017 | Hayashi .................... C10L 5/36 |

FOREIGN PATENT DOCUMENTS

| | | | | |
|---|---|---|---|---|
| CA | 2896771 | A1 * | 6/2014 | ............ C10L 5/361 |
| CA | 2962744 | A1 | 4/2016 | |
| JP | 2000-319676 | A | 11/2000 | |
| JP | 2014-098097 | A | 5/2014 | |
| JP | 2015-067789 | A | 4/2015 | |
| JP | 2020-090673 | | 6/2020 | |
| KR | 10-1999-0037945 | | 5/1999 | |
| KR | 10-1171922 | B1 | 8/2012 | |
| KR | 10-1308869 | B1 | 9/2013 | |
| RU | 2355739 | C1 | 5/2009 | |
| RU | 2013154067 | A | 11/2012 | |
| RU | 2510660 | C2 | 4/2014 | |
| WO | WO 2008/136477 | A1 | 11/2008 | |
| WO | WO2010/138514 | A2 | 12/2010 | |
| WO | WO2012/023479 | A1 | 2/2012 | |
| WO | WO2012/162403 | A1 | 11/2012 | |
| WO | WO 2014/050964 | A1 | 4/2014 | |
| WO | WO 2014/087949 | A1 | 6/2014 | |
| WO | WO 2016/056608 | A1 | 4/2016 | |

OTHER PUBLICATIONS

International Preliminary Report on Patentability issued in International Patent Application No. PCT/JP2017/013990, dated Oct. 9, 2018.
Central Research Institute of Electric Power Industry, Development of an apparatus for evaluating characteristics of biomass carbonization, Central Research Institute of Electric Power Industry Report, 2012, Central Research Institute of Electric Power Industry.
Final Office Action issued in Japanese Patent Application No. 2018-510598, dated Jan. 10, 2019.
First Examination Report issued in Australian Patent Application No. 2017247418, dated Feb. 7, 2019.
Forest Research Institute, Raw material moisture content appropriate for Japanese cedar bark pellet manufacturing, Technology for dissemination, 2010, Forest Research Institute, Forestry Technology Division.
Kuroda et al., Manufacturing of a high-performance wood biomass fuel "hyper wood pellet", Selected Research Results, 2011, 16-17, Forestry and Forest Products Research Institute.
Office Action issued in Japanese Patent Application No. 2018-510598, dated Nov. 27, 2018.
Australian Examination Report No. 2, Austrian Patent Application No. 2015329082, dated Apr. 26, 2018.
Ghiasi et. al., Feasibility of Pelletization and torrefaction of agricultural and woody biomass, The Canadian Society for Bioengineering,Paper No. CSBE15-076, pp. 1-8, Jul. 5-8, 2015.
Ghiasi et. al., Densified biocoal from woodchips: Is it better to do torrefaction before or after denification? Applied Energy, 134:133-142 (2014).
Kleinschmidt, Overview of international developments in torrecaction, IEA Bioenergy Task32, Jan. 28, 2011.
International Preliminary Report on Patentability in International Appliation No. PCT/JP2015/078552,.
First Australian Examination Report, Australian Patent Application No. 2015329082, dated Jan. 5, 2018.
First Australian examination report, Australian Patent Application No. 2018253504, dated Dec. 19, 2018.
First New Zealand examination report, New Zealand Patent Application No. 730693, dated Apr. 12, 2018.
Final Office Action in U.S. Appl. No. 15/514,776, dated Jul. 11, 2019.
Tumuluru et al., A review on biomass torrefaction process and product properties for energy applications, Industrial Biotechnology, 7(5):384-402 (2011).
Notification of Substantive Examination in Indonesia, Indonesia Patent Application No. P00201702868, dated Mar. 18, 2019.
Official Notice in Vietnam, Vietnamese Patent Application No. 1-2017-01676, dated Apr. 28, 2020.
Office Action in U.S. Appl. No. 15/514,776, dated Mar. 26, 2018.
Office Action in U.S. Appl. No. 15/514,776, dated Nov. 30, 2018.
Office Action in U.S. Appl. No. 15/514,776, dated Apr. 1, 2020.
Office Action in Russian Patent Application No. 2018138545, dated Apr. 20, 2020.
Office Action in counterpart Indonesian Patent Application No. P00201808887, dated Nov. 25, 2020.
Decision of Refusal dated Jun. 23, 2021 in Japanese Patent Application No. 2020-005272.
Notice of Reasons for Refusal dated Mar. 11, 2021, in Japanese Patent Application No. 2019-046217.
Notice of Reasons for Refusal dated Feb. 4, 2021, in Japanese Patent Application No. 2020-005272.
Final Office Action in the U.S. Appl. No. 15/514,776 dated Dec. 17, 2020.
Office Action in Vietnamese Patent Application No. 1-2018-04914 dated Jan. 24, 2022.
Office Action in Canadian Patent Application No. 2,962,744 dated Jan. 28, 2022.
Decision of Refusal in Japanese Patent Application No. 2019-046217, dated Aug. 3, 2021.
Office Action in Korean Patent Application No. 10-2018-7031769, dated Aug. 19, 2021.
Office Action in Canadian Patent Application No. 2,962,744 dated Aug. 26, 2021.

\* cited by examiner

BIOMASS SOLID FUEL

This application is the U.S. National Phase under 35 U.S.C. § 371 of International Application No. PCT/JP2017/013990, filed Apr. 3, 2017, designating the U.S., and published in Japanese as WO 2017/175733 on Oct. 12, 2017, which claims priority to Japanese Patent Application No. 2016-076441 filed Apr. 6, 2016, the entire contents of which are incorporated herein by reference.

TECHNICAL FIELD

The present invention relates to a biomass solid fuel.

BACKGROUND ART

In the past, solid fuels obtained by molding wood-based biomasses are known. However, they have problems that handling thereof is difficult because they disintegrate when exposed to rain water and the like during outdoor storage, and also COD (chemical oxygen demand) of discharged water increases due to the elution of organic substances such as tar and the like. Therefore Patent Document 1 discloses a solid fuel obtained by performing molding and heating after steam exploding a plant-based starting material, in which the obtained solid fuel does not disintegrate when exposed to rain water and the like during outdoor storage although a binder and the like is not used, and in addition, the elution of tar component is prevented and COD in a discharged water is reduced.

CITATION LIST

Patent Document

Patent Document 1: WO2014/087949 pamphlet

SUMMARY OF INVENTION

Technical Problem

However the above prior art technology requires a step of steam explosion process, leading to increase in cost.

The present invention has been made to solve this problem, and the object thereof is to provide a biomass solid fuel which has low disintegration property and achieves a reduced COD in discharged water when exposed to rain water and the like, while suppressing an increase in cost.

Solution to Problem

A biomass solid fuel of the present invention is a biomass solid fuel obtained by molding pulverized biomass particles of a raw material, and mutual bonding or adhesion between the pulverized biomass particles is maintained after immersion in water.

Advantageous Effect of Invention

According to the present invention, there is provided a biomass solid fuel which has low disintegration property and achieves a reduced COD in discharged water when exposed to rain water, while suppressing an increase in cost, without the use of steam explosion process and a binder or the like.

DESCRIPTION OF EMBODIMENT

Figure 1:
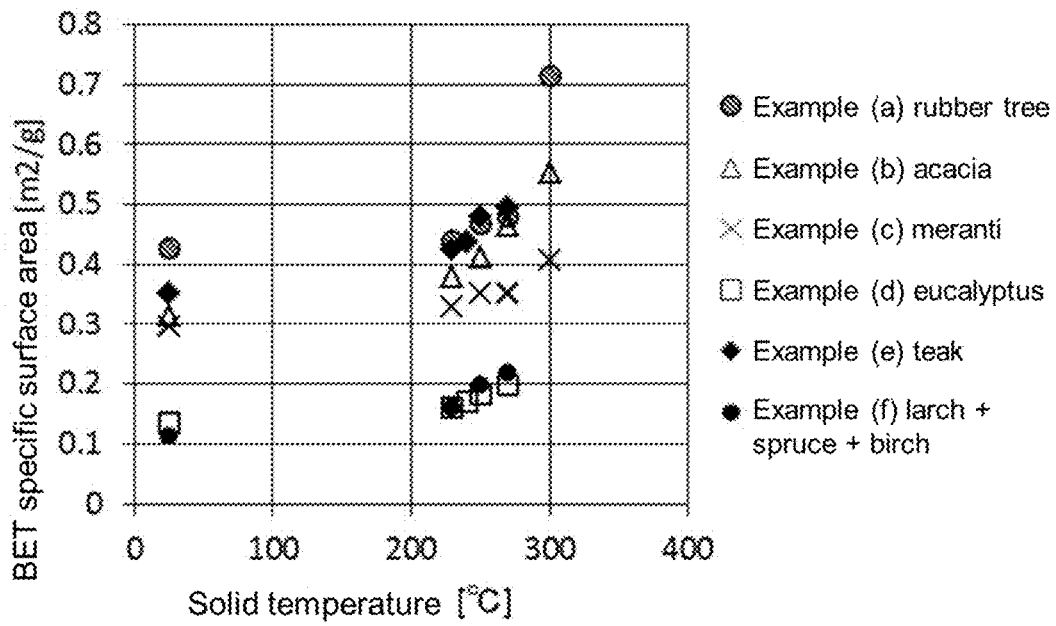
FIG. 1 is a graph showing BET specific surface areas of the solid fuels.
Figure 2:
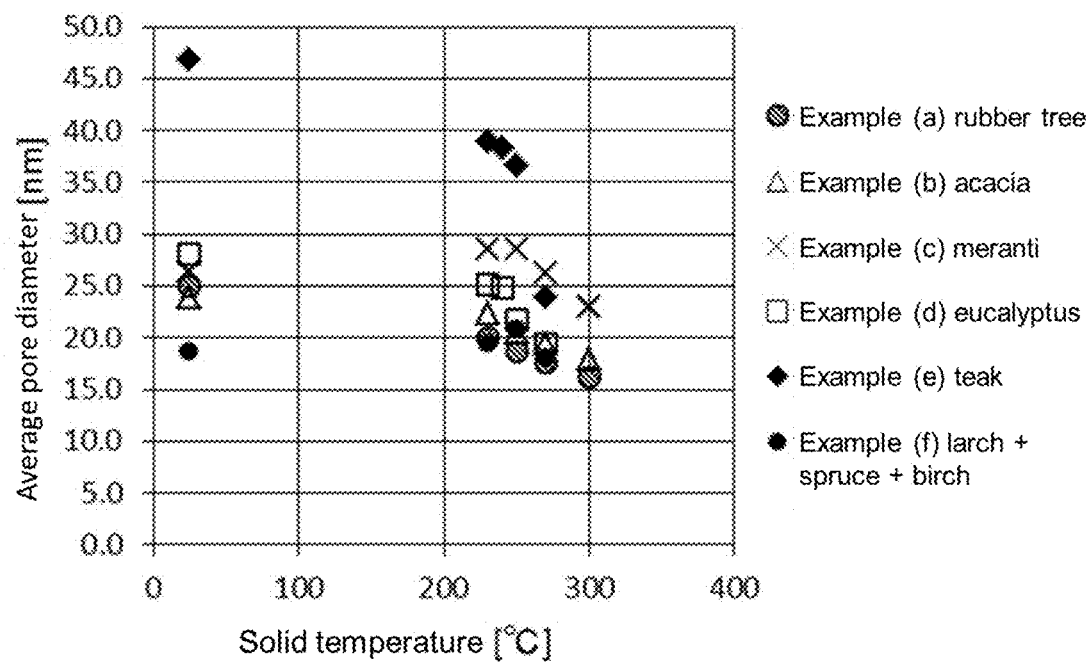
FIG. 2 is a graph showing an average pore diameter of the surface of the solid fuels.
Figure 3:
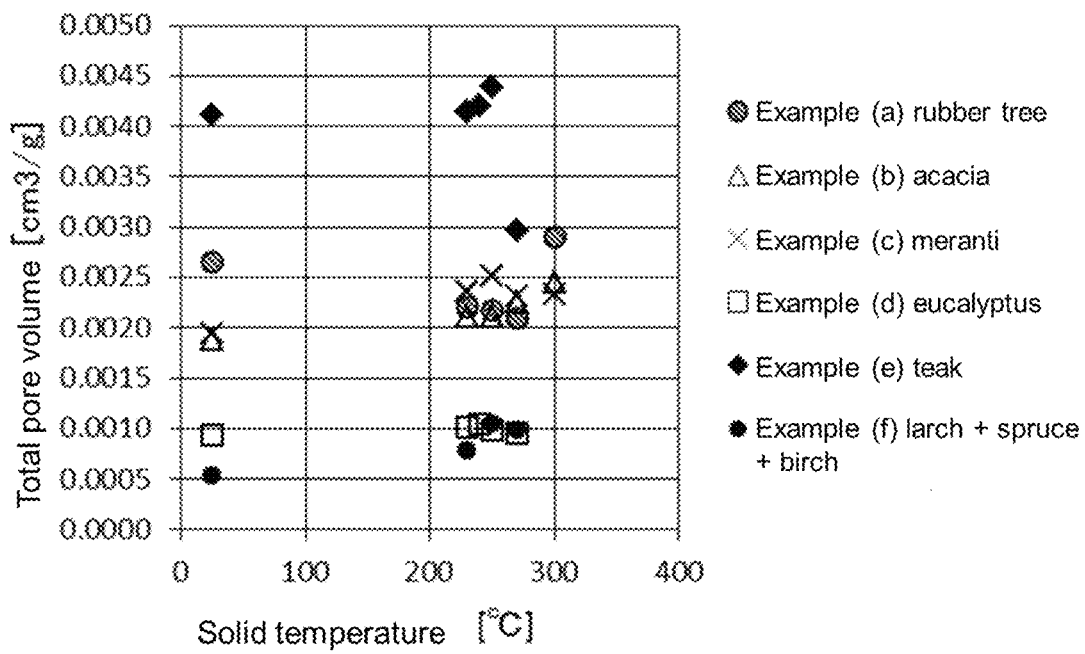
FIG. 3 is a graph showing a total pore volume of the surface of the solid fuels.

The biomass solid fuel of the present invention is a biomass solid fuel obtained by molding pulverized biomass particles of a raw material, and mutual bonding or adhesion between the pulverized biomass particles is maintained after immersion in water.

One embodiment of the biomass solid fuel of the present invention has a fuel ratio (fixed carbon/volatile matter) of preferably 0.15 to 1.50, more preferably 0.17 to 1.50, further preferably 0.20 to 1.50, a dry-basis higher heating value of preferably 4500 to 7000 (kcal/kg), more preferably 4700 to 7000 (kcal/kg), a molar ratio of oxygen O to carbon C (O/C) of preferably 0.1 to 0.7, and a molar ratio of hydrogen H to carbon C (H/C) of preferably 0.70 to 1.40. If the biomass solid fuel has the physical properties within the above ranges, COD of a discharged water during storage can be reduced, disintegration can be reduced and handleability during storage can be improved. The solid fuel of the present invention is a molded solid product obtained by the steps including a molding step of compressing and molding biomass that has been crushed and pulverized to a state of debris or powder into biomass blocks, and a heating step of heating the biomass blocks after the molding step. The molded solid product is used as a fuel (corresponding to PBT mentioned below). The biomass solid fuel of the present invention having preferable properties (for example, water resistance and grindability) can be obtained by adjusting, for example, tree species of the biomass used as a raw material, parts of these, and heating temperature (sometimes referred to as solid temperature in the figures) in the heating step and the like. Proximate analysis (industrial analysis) value, ultimate analysis (elemental analysis) value, and higher heating value in the present specification are based on JIS M 8812, 8813, and 8814.

One embodiment of the biomass solid fuel of the present invention is a product by molding pulverized biomass particles of a raw material comprising at least one selected from the group consisting of rubber tree, acacia, meranti, eucalyptus and teak, or pulverized biomass particles of a raw material of a mixture of larch, spruce and birch. Larch, spruce, and birch may be used alone as raw material biomass, but mixtures thereof are preferred. The biomass solid fuel is a molded solid product obtained by the steps including a molding step of compressing and molding biomass that has been crushed and pulverized to a state of debris or powder into biomass blocks, and a heating step of heating the biomass blocks. The molded and heated solid product is used as a fuel (corresponding to PBT mentioned below). Since the biomass solid fuel of the present invention does not require a step of steam explosion and the use of a binder, the cost increase is suppressed. Herein, biomass as a raw material is also simply referred to as "raw material" or "biomass", the biomass blocks obtained by molding process before the heating step are also referred to as "unheated biomass blocks", and biomass solid fuel is also simply referred to as "solid fuel".

In addition, raw materials may further comprise another tree species other than the above. In one embodiment of the present invention, the total content of rubber tree, acacia, meranti, eucalyptus, teak, larch, spruce and birch is preferably 50% by weight or more, more preferably 80% by weight or more, and may be 100% by weight in the total weight of biomass raw materials.

As described above, the biomass solid fuel of the present invention is produced by a method comprising a molding step and a subsequent heating step. In the molding step, the biomass blocks are formed by using known molding techniques. The biomass blocks are preferably in a form of pellet or briquette, and the size thereof is arbitrary. In the heating step, the molded biomass blocks are heated.

In a biomass solid fuel obtained after the heating step, the COD (Chemical Oxygen Demand) of an immersion water used for water immersion is preferably 3,000 ppm or less. In addition, COD ratio represented by (COD of biomass solid fuel after the heating step/COD of unheated biomass solid fuel) of the biomass solid fuel is preferably 1.00 or less, and more preferably 0.98 or less. Here, the COD (Chemical Oxygen Demand) of an immersion water used for water immersion of a biomass solid fuel (simply, may be referred to as "COD") means a COD value assayed in accordance with JIS K0102(2010)-17 for a sample of immersion water for COD determination prepared in accordance with Japan Environment Agency Announcement No. 13 "(A) a method for detecting a metal or the like contained in an industrial waste", 1973.

The biomass solid fuel obtained after the heating step has a Hardgrove grindability index (HGI) in accordance with JIS M 8801 of preferably 15 or more and 70 or less, and more preferably 20 or more and 60 or less. BET specific surface area thereof is preferably 0.11 $m^2/g$ to 0.80 $m^2/g$, more preferably 0.15 $m^2/g$ to 0.80 $m^2/g$, further preferably 0.3 to 0.8 $m^2/g$, and still further preferably 0.3 to 0.7 $m^2/g$. The equilibrium moisture content after immersion in water is preferably 10 to 65 wt %, more preferably 15 to 65 wt %, further preferably 15 to 50 wt %, and still further preferably 15 to 45 wt %.

The method of manufacturing a biomass solid fuel of the present invention comprises a molding step of molding pulverized biomass particles of the biomass that has been crushed and pulverized to obtain unheated biomass blocks, and a heating step of heating the unheated biomass blocks whereby providing a heated solid product, wherein the heating temperature in the heating step is preferably 150° C. to 400° C. With the temperature of the heating step within the above range, the biomass solid fuel having the above properties can be obtained. The heating temperature is appropriately determined depending on biomass raw materials and the shape and size of biomass blocks, but it is preferably 150 to 400° C., more preferably 200 to 350° C., further preferably 230 to 300° C., particularly preferably 230 to 290° C. The heating time in the heating step is not particularly limited, but it is preferably 0.2 to 3 hours.

The particle size of the pulverized biomass particles is not particularly limited, but the average size is preferably about 100 to 3000 μm, and more preferably 400 to 1000 μm. As the method of measuring the particle size of the pulverized biomass particles, known measurement methods may be used. Since mutual bonding or adhesion between the pulverized biomass particles is maintained by solid cross-linking in the biomass solid fuel (PBT) of the present invention as described below, the particle size of the pulverized biomass particles is not particularly limited as long as it is within a moldable range. Further, since the fine pulverization becomes a cause of cost increase, the particle size may be within a known range as long as both of cost and moldability can stand together.

When A denotes the bulk density of the unheated biomass blocks before heating step and B denotes the bulk density of the heated solid product after the heating step, it is preferred that B/A=0.6 to 1. The value of the bulk density A is not particularly limited as long as it is within such a known range that unheated biomass blocks can be obtained by molding the pulverized biomass particles. The bulk density varies depending on the kind of biomass raw materials, and thus it may be appropriately set. The bulk density can be measured by the method described in Examples later. When H1 denotes HGI (Hardgrove grindability index of JIS M8801) of unheated biomass blocks and H2 denotes HGI of heated solid products, it is preferred that the H2/H1=1.1 to 4.0 is satisfied, and more preferred that it is 1.1 to 2.5. By performing the heating so that one or both of the values of B/A (bulk density ratio) and H2/H1 (HGI ratio) is within the ranges, it is possible to obtain a biomass solid fuel having improved handleability during storage by reducing disintegration while reducing the COD in the discharged water during storage.

In the solid fuel of the present invention, the expansion ratio of the length and/or diameter before and after immersion in water is preferably 20% or less, the volume expansion ratio is preferably 173% or less, more preferably 160% or less. It is more preferable that the expansion ratios of the diameter and the length are 15% or less and the volume expansion ratio is about 152% or less. It is further preferable that the expansion ratios of the diameter and the length are 13% or less and the volume expansion ratio is about 140% or less. It is further preferable that the expansion ratios of the diameter and the length is 11% or less and the volume expansion ratio is about 137% or less. It is still further preferable that the length expansion ratio is 10% or less. As described above, since the expansion ratios after immersion in water are within a certain range, the biomass solid fuel of the present invention does not disintegrate even by immersion, showing that it has water resistance. The length expansion ratio, the diameter expansion ratio and the volume expansion ratio can be measured by the method described in the Examples.

Herein, characteristics of the biomass solid fuel may be determined in a preferable range depending on tree species of biomass used as a raw material. Hereinafter, preferred ranges will be described about species of biomass raw materials used in the present invention, properties of the obtained solid fuels (corresponding to PBT as mentioned below) and their manufacturing method, respectively, but these are merely examples and the present invention is not limited thereto.

[Species of Biomass Raw Material and Properties of Solid Fuel]

(Rubber Tree: Solid Fuel a)

As an aspect of the present invention, when a raw material is rubber tree, the properties of a biomass solid fuel (hereinafter, may be referred to as a solid fuel a) is as follows.

COD thereof is preferably 2500 ppm or less, more preferably 1100 ppm or less, further more preferably 600 ppm or less, and COD ratio thereof is preferably 1.00 or less, more preferably 0.60 or less, and further more preferably 0.55 or less.

The equilibrium moisture content after immersion in water thereof (corresponding to a moisture content of the solid as described in the Examples) is preferably 15 wt % to 45 wt %, more preferably 15 wt % to 40 wt %, and further more preferably 15 wt % to 32 wt %.

The BET specific surface area thereof is preferably 0.43 $m^2/g$ to 0.80 $m^2/g$, more preferably 0.44 $m^2/g$ to 0.80 $m^2/g$, and further more preferably 0.47 $m^2/g$ to 0.80 $m^2/g$.

The HGI thereof is preferably 30 to 70, more preferably 35 to 70, and further more preferably 45 to 70. HGI ratio (described later) is preferably 1.5 to 4.0, more preferably 2.0 to 4.0, and further more preferably 2.5 to 4.0.

The fuel ratio thereof is preferably 0.20 to 1.50, and more preferably 0.25 to 1.50.

The dry-basis higher heating value thereof is preferably 4700 to 7000 kcal/kg, more preferably 5000 to 7000 kcal/kg, and further more preferably 5100 to 7000 kcal/kg.

The molar ratio of oxygen O to carbon C (O/C) thereof is preferably 0.10 to 0.65, more preferably 0.15 to 0.60. The molar ratio of hydrogen H to carbon C (H/C) thereof is preferably 0.70 to 1.38, and more preferably 0.70 to 1.35.

The diameter expansion ratio thereof is preferably 20% or less, more preferably 15% or less, and further more preferably 5% or less.

The length expansion ratio thereof is preferably 10% or less, more preferably 7% or less, and further more preferably 4% or less.

The volume expansion ratio thereof is preferably 158% or less, more preferably 142% or less, and further more preferably 115% or less.

The foregoing description is the preferred range of properties of the solid fuel a.

In addition, when manufacturing the solid fuel a, the heating temperature in the heating step is preferably 230 to 350° C., more preferably 250 to 300° C., and further more preferably 255 to 290° C.

(Acacia: Solid Fuel b)

As an aspect of the present invention, when a raw material is acacia xylem part, the properties of a biomass solid fuel (hereinafter, may be referred to as a solid fuel b) is as follows.

COD thereof is preferably 400 ppm or less, more preferably 350 ppm or less, further more preferably 250 ppm or less, and COD ratio thereof is preferably 1.00 or less, more preferably 0.98 or less, and further more preferably 0.81 or less.

The equilibrium moisture content after immersion in water thereof is preferably 15 wt % to 30 wt %, more preferably 18 wt % to 27 wt %, and further more preferably 18 wt % to 24 wt %.

The HGI thereof is preferably 20 to 70, more preferably 35 to 65, and further more preferably 40 to 65.

The BET specific surface area thereof is preferably 0.32 $m^2/g$ to 0.60 $m^2/g$, more preferably 0.35 $m^2/g$ to 0.60 $m^2/g$, and further more preferably 0.35 $m^2/g$ to 0.55 $m^2/g$.

The fuel ratio thereof is preferably 0.21 to 0.90, more preferably 0.21 to 0.88, and further more preferably 0.21 to 0.85.

The dry-basis higher heating value thereof is preferably 4790 to 7000 kcal/kg, more preferably 4800 to 7000 kcal/kg, and further more preferably 4900 to 6500 kcal/kg.

The molar ratio of oxygen O to carbon C (O/C) thereof is preferably 0.25 to 0.62, more preferably 0.28 to 0.61, and further more preferably 0.30 to 0.61.

The molar ratio of hydrogen H to carbon C (H/C) thereof is preferably 0.80 to 1.30, more preferably 0.90 to 1.30, and further more preferably 0.90 to 1.29.

The diameter expansion ratio thereof is preferably 15% or less, more preferably 9% or less, and further more preferably 7% or less.

The length expansion ratio thereof is preferably 8% or less, more preferably 5% or less, and further more preferably 4% or less.

The volume expansion ratio thereof is preferably 143% or less, more preferably 127% or less, and further more preferably 119% or less.

The foregoing description is the preferred range of properties of the solid fuel b.

In addition, when manufacturing the solid fuel b, the heating temperature in the heating step is preferably 200 to 350° C., more preferably 220 to 300° C., and further more preferably 230 to 290° C.

(Meranti: Solid Fuel c)

As an aspect of the present invention, when a raw material is meranti, the properties of a biomass solid fuel (hereinafter, may be referred to as a solid fuel c) is as follows.

COD thereof is preferably 550 ppm or less, more preferably 500 ppm or less, further more preferably 300 ppm or less, and COD ratio thereof is preferably 0.98 or less, more preferably 0.89 or less, and further more preferably 0.54 or less.

The equilibrium moisture content after immersion in water thereof is preferably 15 wt % to 30 wt %, more preferably 15 wt % to 27 wt %, and further more preferably 17 wt % to 26 wt %.

The HGI thereof is preferably 25 to 70, more preferably 30 to 70, and further more preferably 30 to 60.

The BET specific surface area thereof is preferably 0.30 to 0.45 $m^2/g$, more preferably 0.30 to 0.41 $m^2/g$, and further more preferably 0.33 to 0.40 $m^2/g$.

The fuel ratio thereof is preferably 0.19 to 0.80, more preferably 0.20 to 0.80, and further more preferably 0.20 to 0.50, and particularly preferably 0.21 to 0.5.

The dry-basis higher heating value thereof is preferably 4800 to 7000 kcal/kg, more preferably 4800 to 6500 kcal/kg, and further more preferably 4900 to 6000 kcal/kg.

The molar ratio of oxygen O to carbon C (O/C) thereof is preferably 0.30 to 0.62, more preferably 0.30 to 0.61, and further more preferably 0.35 to 0.61.

The molar ratio of hydrogen H to carbon C (H/C) thereof is preferably 0.90 to 1.30, more preferably 0.95 to 1.30, and further more preferably 1.00 to 1.30.

The diameter expansion ratio thereof is preferably 15% or less, more preferably 12% or less, and further more preferably 10% or less.

The length expansion ratio thereof is preferably 10% or less, more preferably 8% or less, and further more preferably 6% or less.

The volume expansion ratio thereof is preferably 145% or less, more preferably 135% or less, and further more preferably 128% or less.

The foregoing description is the preferred range of properties of the solid fuel c.

In addition, when manufacturing the solid fuel c, the heating temperature in the heating step is preferably 200 to 350° C., more preferably 220 to 300° C., and further more preferably 230 to 290° C.

(Eucalyptus: Solid Fuel d)

As an aspect of the present invention, when a raw material is a eucalyptus, the properties of a biomass solid fuel (hereinafter, may be referred to as a solid fuel d) is as follows.

COD thereof is preferably 900 ppm or less, more preferably 800 ppm or less, further more preferably 650 ppm or less, and COD ratio thereof is preferably 0.95 or less, more preferably 0.84 or less, and further more preferably 0.68 or less.

The equilibrium moisture content after immersion in water thereof (corresponding to a moisture content of the solid in the Examples) is preferably 13 wt % to 25 wt %, more preferably 15 wt % to 24 wt %, and further more preferably 15 wt % to 23 wt %.

The BET specific surface area thereof is preferably 0.135 $m^2/g$ to 0.210 $m^2/g$, more preferably 0.140 $m^2/g$ to 0.210 $m^2/g$, and further more preferably 0.150 $m^2/g$ to 0.195 $m^2/g$.

The HGI thereof is preferably 25 to 50, more preferably 27 to 45, and further more preferably 30 to 40. HGI ratio (described later) is preferably 1.1 to 4.0, more preferably 1.4 to 2.3, and further more preferably 1.5 to 2.0.

The fuel ratio thereof is preferably 0.18 to 0.60, more preferably 0.19 to 0.50, and further more preferably 0.23 to 0.44.

The dry-basis higher heating value thereof is preferably 4690 to 6000 kcal/kg, more preferably 4900 to 5700 kcal/kg, and further more preferably 5000 to 5600 kcal/kg.

The molar ratio of oxygen O to carbon C (O/C) thereof is preferably 0.35 to 0.65, more preferably 0.40 to 0.63, and further more preferably 0.45 to 0.59. The molar ratio of hydrogen H to carbon C (H/C) thereof is preferably 1.00 to 1.24, more preferably 1.05 to 1.24, and further more preferably 1.05 to 1.169.

The diameter expansion ratio thereof is preferably 8.0% or less, more preferably 7.0% or less, and further more preferably 6.0% or less.

The length expansion ratio thereof is preferably 6.0% or less, more preferably 5.5% or less, and further more preferably 4.5% or less.

The volume expansion ratio thereof is preferably 127% or less, more preferably 121% or less, and further more preferably 117% or less.

The foregoing description is the preferred range of properties of the solid fuel d.

In addition, when manufacturing the solid fuel d, the heating temperature in the heating step is preferably 200 to 350° C., more preferably 220 to 300° C., and further more preferably 231 to 265° C.

(Teak: Solid Fuel e)

As an aspect of the present invention, when a raw material is teak, the properties of a biomass solid fuel (hereinafter, may be referred to as a solid fuel e) is as follows.

COD thereof is preferably 1500 ppm or less, more preferably 1200 ppm or less, further more preferably 1000 ppm or less, and COD ratio thereof is preferably 0.75 or less, more preferably 0.60 or less, and further more preferably 0.50 or less.

The equilibrium moisture content after immersion in water thereof (corresponding to a moisture content of the solid in the Examples) is preferably 15 wt % to 30 wt %, more preferably 17 wt % to 29 wt %, and further more preferably 17 wt % to 28 wt %.

The BET specific surface area thereof is preferably 0.355 $m^2/g$ to 0.550 $m^2/g$, more preferably 0.425 $m^2/g$ to 0.530 $m^2/g$, and further more preferably 0.430 $m^2/g$ to 0.490 $m^2/g$.

The HGI thereof is preferably 21 to 45, more preferably 22 to 40, and further more preferably 25 to 38. HGI ratio (described later) is preferably 1.1 to 4.0, more preferably 1.1 to 2.0, and further more preferably 1.3 to 1.9.

The fuel ratio thereof is preferably 0.23 to 0.60, more preferably 0.27 to 0.55, and further more preferably 0.27 to 0.49.

The dry-basis higher heating value thereof is preferably 4600 to 6000 kcal/kg, more preferably 4780 to 5500 kcal/kg, and further more preferably 4800 to 5350 kcal/kg.

The molar ratio of oxygen O to carbon C (O/C) thereof is preferably 0.40 to 0.65, more preferably 0.40 to 0.58, and further more preferably 0.45 to 0.58. The molar ratio of hydrogen H to carbon C (H/C) thereof is preferably 1.0 to 1.3, more preferably 1.05 to 1.26, and further more preferably 1.10 to 1.25.

The diameter expansion ratio thereof is preferably 15.0% or less, more preferably 12.0% or less, and further more preferably 11.0% or less.

The length expansion ratio thereof is preferably 6.0% or less, more preferably 4.5% or less, and further more preferably 4.0% or less.

The volume expansion ratio thereof is preferably 140% or less, more preferably 131% or less, and further more preferably 128% or less.

The foregoing description is the preferred range of properties of the solid fuel e.

In addition, when manufacturing the solid fuel e, the heating temperature in the heating step is preferably 200 to 350° C., more preferably 230 to 300° C., and further more preferably 235 to 269° C.

(Mixture of Larch, Spruce and Birch: Solid Fuel f)

As an aspect of the present invention, when a raw material is a mixture of larch, spruce and birch, the properties of a biomass solid fuel (hereinafter, may be referred to as a solid fuel f) is as follows. Although the mixing ratio of larch, spruce and birch is not particularly limited, they may be mixed at a weight ratio of larch:spruce:birch=30 to 70: 25 to 65: 0 to 25.

COD thereof is preferably 1200 ppm or less, more preferably 1000 ppm or less, further more preferably 850 ppm or less, and COD ratio thereof is preferably 0.33 or less, more preferably 0.28 or less, and further more preferably 0.24 or less.

The equilibrium moisture content after immersion in water thereof is preferably 15 wt % to 30 wt %, more preferably 15 wt % to 28 wt %, and further more preferably 15 wt % to 27 wt %.

The BET specific surface area thereof is preferably 0.150 $m^2/g$ to 0.250 $m^2/g$, more preferably 0.160 $m^2/g$ to 0.250 $m^2/g$, and further more preferably 0.170 $m^2/g$ to 0.250 $m^2/g$.

The HGI thereof is preferably 18 to 45, more preferably 21 to 40, and further more preferably 22 to 35. HGI ratio (described later) is preferably 1.1 to 4.0, more preferably 1.2 to 2.4, and further more preferably 1.2 to 2.2.

The fuel ratio thereof is preferably 0.165 to 0.35, more preferably 0.17 to 0.35, and further more preferably 0.18 to 0.30.

The dry-basis higher heating value thereof is preferably 4800 to 6000 kcal/kg, more preferably 4900 to 5700 kcal/kg, and further more preferably 5000 to 5500 kcal/kg.

The molar ratio of oxygen O to carbon C (O/C) thereof is preferably 0.45 to 0.64, more preferably 0.47 to 0.62, and further more preferably 0.50 to 0.61. The molar ratio of hydrogen H to carbon C (H/C) thereof is preferably 1.0 to 1.3, more preferably 1.1 to 1.3, and further more preferably 1.10 to 1.29.

The diameter expansion ratio thereof is preferably 15.0% or less, more preferably 13.0% or less, and further more preferably 10.0% or less.

The length expansion ratio thereof is preferably 7.0% or less, more preferably 6.0% or less, and further more preferably 4.5% or less.

The volume expansion ratio thereof is preferably 142% or less, more preferably 135% or less, and further more preferably 126% or less.

The foregoing description is the preferred range of properties of the solid fuel f.

In addition, when manufacturing the solid fuel f, the heating temperature in the heating step is preferably 200 to 350° C., more preferably 230 to 310° C., and further more preferably 240 to 300° C.

The inventors of the present invention presume that, in the method of manufacturing the biomass solid fuel, because the method has such an order of the steps that the heating step of heating the unheated biomass blocks is performed after the molding step, mutual bonding or adhesion between the pulverized biomass particles is maintained by using components originated from the raw material biomass without using a binder, which enables the production of biomass solid fuels having high water-resistant which do not disintegrate by immersion in water. According to the analysis of the present inventors, the following findings are obtained regarding the mechanism that the biomass solid fuels acquire water resistance.

Figure 9:
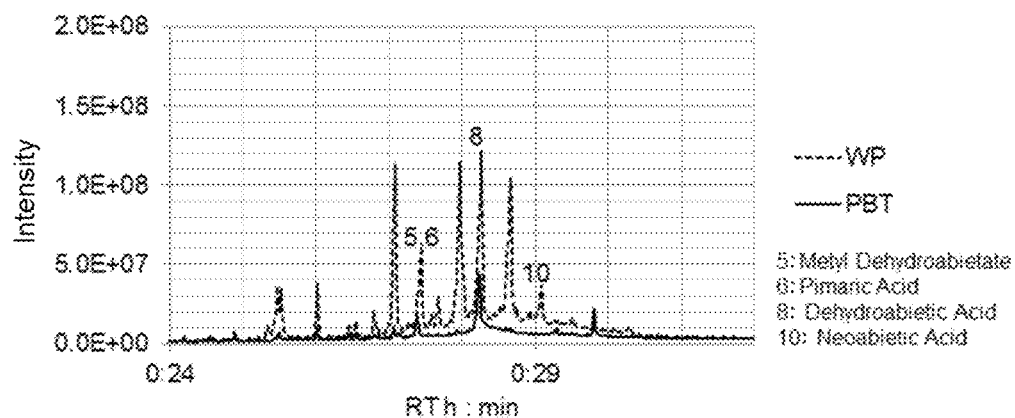
FIG. 9 is a chart showing the results of GC-MS analysis of acetone extract solution of the solid fuels.

The present inventors performed FT-IR analysis, GC-MS analysis, and SEM observation about three types of biomass solid fuels manufactured by different production methods, specifically an unheated solid fuel obtained by molding pulverized biomass particles (White Pellet: may be referred to as "WP"), and a solid fuel obtained by heating after molding pulverized biomass particles (Pelletizing Before Torrefaction; may be referred to as "PBT"), and analyzed the mechanism of water resistance of the biomass solid fuels. Herein, binders were not used either in WP or PBT. FIGS. 5 to 8 show examples of the results of FT-IR analysis of biomass solid fuels, and FIG. 9 shows the result of GC-MS analysis of acetone extract solution of biomass solid fuel (for details, refer to Examples).

First, acetone extracts of the respective solid fuels were analyzed by FT-IR. In the PBT obtained through the heating step, content of hydrophilic COOH groups is in small, but content of C=C bond is large as compared with the unheated WP. This suggests that the chemical structure of the components constituting the biomass has changed and has become hydrophobic by heating.

In addition, the acetone extract components of the respective solid fuels were analyzed by GC-MS analysis. It is suggested that terpenes such as abietic acid and derivatives thereof (hereinafter, may be referred to as "abietic acid and the like") have thermally decomposed by heating, and this fact relates to the water resistance of the biomass solid fuel. The abietic acid and the like are main components of rosins contained in pine and the like.

Figure 4:
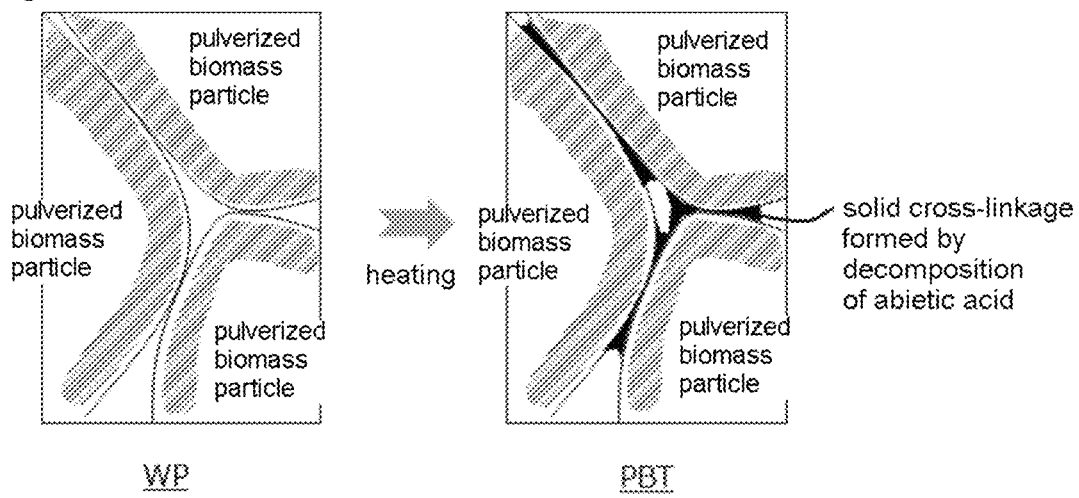
FIG. 4 is a diagram showing (estimated) mechanism of the development of solid cross-links in PBT.
Figure 5:
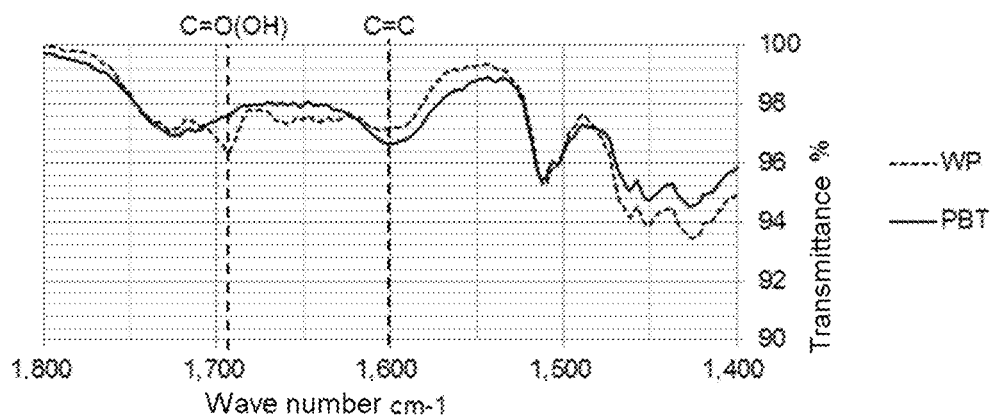
FIG. 5 is a chart showing the results of FT-IR analysis of the outer surface of pellets of the solid fuels.
Figure 6:
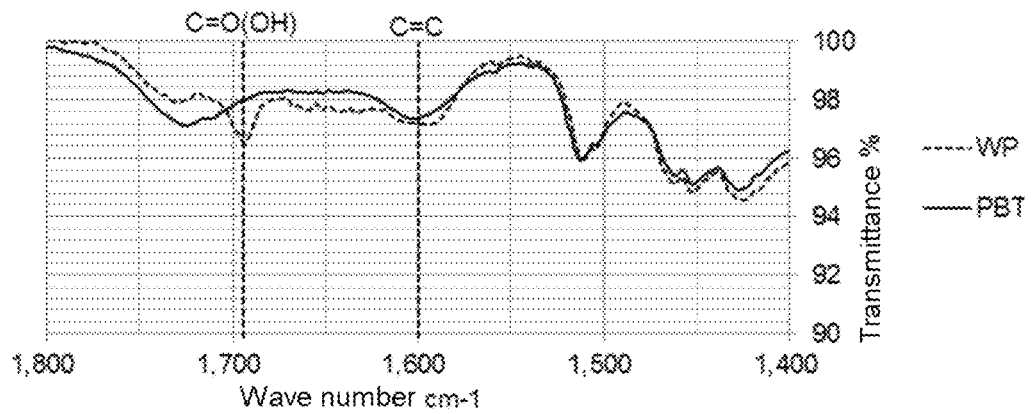
FIG. 6 is a chart showing the results of FT-IR analysis of the cross-sectional center of pellets of the solid fuels.
Figure 7:
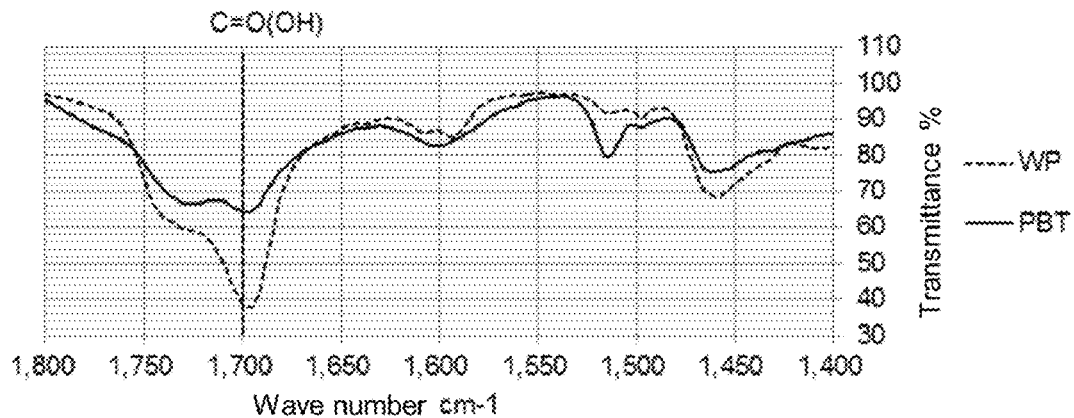
FIG. 7 is a chart showing the results of FT-IR analysis of acetone extract solution of the solid fuels.
Figure 8:
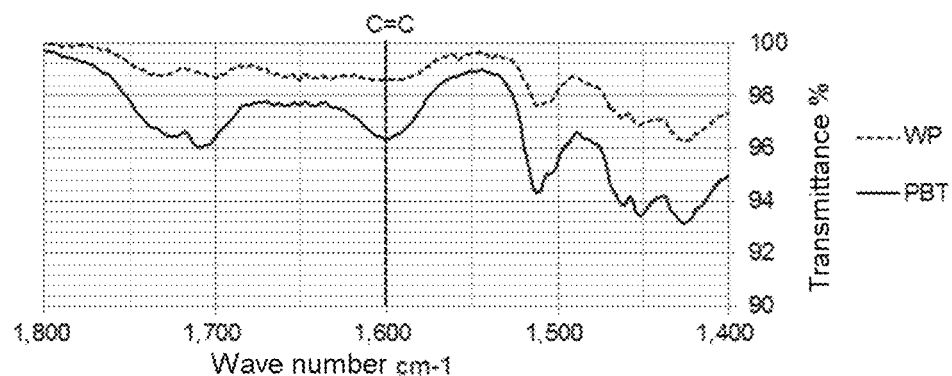
FIG. 8 is a chart showing the results of FT-IR analysis of the solid of solid fuels after acetone extract.

FIG. 4 is a diagram illustrating a (estimated) mechanism of the development of solid cross-linking in PBT. In the case of PBT, in the heating step after the molding step, melted liquid of the abietic acid elutes in the gap between biomass (the gap between adjacent pulverized biomass particles that have been compacted by molding after pulverizing; herein the biomass may be also referred to as "pulverized biomass") with the rise of temperature, and the evaporation and thermal decomposition of abietic acid take place to form hydrophobic materials, which are fixed in the gap between the pulverized biomass particles to develop cross-linkage (solid cross-linkage). Thus, without the addition of a binder, mutual bonding or adhesion between the pulverized biomass particles is maintained by the abietic acid and the like derived from biomass raw material. Thus, it is speculated that because pulverized biomass particles are connected or bonded to each other to prevent water penetration, water resistance is improved.

On the other hand, in the case of WP which is unheated and obtained only by molding pulverized biomass particles, no solid cross-linkage of the pulverized biomass between powder particles exists unlike the above PBT. Since there are a lot of hydrophilic COOH group and the like on the surface of raw pulverized biomass particles constituting the WP, water easily enters. The penetrated water expands the gap between the pulverized biomass particles wider, and thus, the molded pellets and the like disintegrate easily.

Furthermore, in the case of solid fuels molded after heating the pulverized biomass particles (Pelletizing After Torrefaction; hereinafter may be referred to as PAT), the individual pulverized biomass particles themselves become hydrophobic on the surface due to elution of abietic acid etc. However, since the pulverizing and molding is performed after they become hydrophobic by heating, formation of the cross-linkage between the pulverized biomass particles are not expected unlike the above PBT. Therefore, in the case of PAT in which heating is performed before the molding, water easily penetrates into the gap between the compacted pulverized biomass particles, and thus it has poor water resistance as compared with PBT.

The melting point of abietic acid or derivatives thereof is about 139 to 142° C., and the boiling point is about 250° C. Thus, abietic acid and the like melt by heating at temperature near the melting point to form liquid cross-linkage, and abietic acid and the like decompose thermally at temperature near the boiling point to develop the formation of solid cross-linkage.

It should be noted that terpenes, including abietic acid, are contained in biomass in general (see, Hokkaido Forest Products Research Institute monthly report 171, April 1966, Public Interest Incorporated Association Japan Wood Protection Association, "Wood Preservation" Vol. 34-2 (2008), etc.). Although there are small differences in content depending on the type of biomass (see, "use of essential oil", Ohira Tatsuro, Japan Wood Society the 6th Research Subcommittee Report p 72, Table 1, Japan Wood Society 1999, etc.), all of Examples described below showed the generation of water resistance by heating 230° C. or higher (disintegration does not occur even after immersion in water, see Table 2), and therefore it is considered that the heating the biomass in general at temperature at least 230° C. or higher to 250° C. or higher provides water resistance.

In addition, in the case of PBT, the strength of the solid fuel is improved due to the development of the solid cross-linking, and therefore it is presumed that good grindability (HGI, ball mill grindability) and good handleability (mechanical durability and disintegration tests) is obtained without the addition of a binder, by heating at least 230° C. or higher to 250° C. or higher as similar to the water resistance. As mentioned above, COD is reduced when PBT is used. This is considered because the tar component of the biomass raw material volatilizes by heating, and at the same time the solidified abietic acid and the like covers the surface of solid fuel PBT, which further increases hydrophobicity of the surface of the solid fuel to prevent the elution of tar component remaining in the biomass raw material.

EXAMPLE

Hereinafter, the present invention will be specifically described with reference to Examples, but the present invention is not limited thereto.

In the following Example a to Example f, biomass solid fuels were produced by the following production methods, respectively. The properties and the like of these solid fuels are shown in Table 1 to Table 4.

Example a: Rubber Tree

In the following Examples a1 to a4 and Comparative Example a, a biomass solid fuel was produced using a rubber tree as a biomass raw material as described below.

Example a1 to Example a4

A biomass solid fuel a (PBT) was obtained through a molding step of pulverizing biomass after crushing and molding the pulverized biomass particles, and subsequent heating step. The binder is not used in any step. In the molding process of each Example, the raw material was molded into a pellet shape with a diameter of 8 mm. In the heating step of each Example, 4 kg of raw material (molded biomass) is charged in an electric batch furnace having 600 mm diameter and heated to target temperatures (heating temperature in Table 1) in respective Examples with a heating rate of 2° C./min. Hereinafter, the target temperature and the heating temperature refer to the same meaning. In Examples a1 to a4, temperature was not maintained at the target temperature (heating temperature) (this also applies to the following Examples b to f). Table 1 and Table 2 show the heating temperature of the heating step in Examples a1 to a4 and the properties of the resulting biomass solid fuel a obtained after the heating step.

Comparative Example a

Comparative Example a is an unheated biomass solid fuel (WP) which is obtained only by molding after crushing and pulverizing, and is not through the heating step. A binder is not used also in Comparative Example a. Table 1 and Table 2 also show the properties of the resulting solid fuel of Comparative Example a. In the unheated biomass solid fuel (WP) of Comparative Example a, after immersing in water for 168 hours, the pellets disintegrated and thus each property cannot be measured.

The analysis method conducted for each biomass solid fuel is described below.

<Before Immersion in Water>

[Yield]

In Tables 1 and 3, solid yield is a weight ratio before and after heating (100×dry weight after heating/dry weight before heating (%)), and thermal yield is a ratio of heating value before and after heating (higher heating value after heating (dry-basis)×solid yield/higher heating value before heating (dry-basis)). As mentioned above, temperature was not maintained at the target temperature (heating temperature) in each Example.

Furthermore, in Tables 1 and 3, a higher heating value (dry-basis), a fuel ratio calculated based on proximate analysis values (air dried basis), and results of ultimate analysis values (dry-basis) and molar ratios of oxygen O, carbon C and hydrogen H obtained based on the ultimate analysis. HGI is based on JIS M 8801 as described above, and the larger value indicates better grindability. HGI ratio is calculated by 100×HGI after heating/HGI before heating (%). In Table 1, "HHV" is a higher heating value (dry-basis), "FC" is a fixed carbon (air dried basis), "VM" is a volatile matter (air dried basis), the fuel ratio is a value calculated by "FC/VM".

[Ball Mill Grindability]

The pulverizing time of each biomass solid fuel was 20 minutes, and 150 μm sieve-passed weight ratio after 20 minutes was determined as pulverizing point. Herein, measuring was carried out by using a ball mill conforming to JIS M4002, wherein into a cylindrical container having an inner diameter of 305 mm×axial length of 305 mm, normal grade ball bearings as defined in JIS B1501 (Φ36.5 mm×43 balls, Φ30.2 mm×67 balls, Φ24.4 mm×10 balls, Φ19.1 mm×71 balls and Φ15.9 mm×94 balls) was charged and the container was rotated at a speed of 70 rpm. The higher value indicates that the grindability is improved.

[Dimension Before Immersion in Water (Diameter and Length)]

The pellet length (L1) and the pellet diameter (φ1) of each solid fuel before immersion in water were measured. For the pellet length, ten pellets before the immersion were randomly chosen for each solid fuel, and their length was measured by an electronic caliper (manufactured by Mitutoyo: CD-15CX, repeating precision is 0.01 mm and the second decimal place was rounded.). In case that the pellet end was diagonal, the length up to the most distal end portion was measured. The pellet diameter was also measured using the same electronic caliper. Measured values of pellet length and pellet diameter are average values of 10 pellets.

[Solid Strength Before and After Immersion in Water (Mechanical Durability)]

For each solid fuel, mechanical durability DU was determined based on the following equation in accordance with the United States agriculture industry's standard ASAE S 269.4 and German Industrial Standard DIN EN 15210-1. In the equation, m0 is a sample weight before rotation treatment, m1 is a sieve-on weight of sample after the rotation treatment, wherein the sieve used was a plate sieve having circle holes with 3.15 mm diameter.

$$DU=(m1/m0)\times100$$

[Bulk Density]

For each solid fuel, according to the UK national standard BS EN15103: 2009, the bulk density BD is calculated by the following formula:

$$BD=(m2\cdot m1)/V$$

For the measurement, a container having an inner diameter of 167 mm×a height of 228 mm was used. In the formula, m1 is a container weight, m2 is the total of a container weight and a sample weight, and V is a container volume.

[Pore Size Distribution]

(BET Specific Surface Area)

BET specific surface area was determined using an automatic specific surface area/pore size distribution measuring apparatus (Nippon Bell Co., Ltd. BELSORP-min II) for each solid fuel that had been cut into a size of 2 to 6 mm, filled in a container, and degassed in vacuo for 2 hours at 100° C. as a pretreatment. Nitrogen gas was used as an adsorption gas. Tables 2 and 4 and FIG. 1 show the relationship between the temperature and the BET specific surface area of each solid fuel.

(Average Pore Diameter, Total Pore Volume)

Average pore diameter and total pore volume were measured using the same equipment used for BET specific surface area. The term "pore" used herein means cavity having a diameter of 2 nm to 100 nm. Table 2 shows the average pore diameter at surface of each solid fuel and Table 3 shows the total pore volume of each solid fuel.

<After Immersion in Water>

Further, Tables 2 and 4 show COD in the immersion water when the biomass solid fuels were immersed in water. Tables 2 and 4 also show the diameter, length, pH, moisture content of the solid, and mechanical durability after the biomass solid fuels are immersed in water for 168 hours. Measurement methods for each property are as follows.

[COD]

COD (chemical oxygen demand) in the immersion water was determined when each biomass solid fuel was immersed in water. A sample of immersion water for COD determination was prepared in accordance with Japan Environment Agency Announcement No. 13 "(A) a method for detecting a metal or the like contained in an industrial waste", 1973, and COD was analyzed in accordance with JIS K0102 (2010)-17.

[Dimension After Immersion in Water (Diameter and Length)]

The pellet length (L2) and the pellet diameter ($\varphi$2) of each solid fuel after immersion in water were measured. For the pellet length, ten pellets before the immersion were randomly chosen for each solid fuel, and their length was measured by an electronic caliper (manufactured by Mitutoyo: CD-15CX, repeating precision is 0.01 mm and the second decimal place was rounded.). In case that the pellet end was diagonal, the length up to the most distal end portion was measured. The pellet diameter was also measured using the same electronic caliper. Measured values of pellet length and pellet diameter are average values of 10 pellets.

[Expansion Ratio Before and After Immersion in Water]

The pellet length and pellet diameter before and after immersion in water of each solid fuel were measured as described above and the expansion ratio was calculated. When the average length of the ten pellets before immersion in water is L1 (mm) and the average length of the same ten pellets after immersion in water for 168 hours is L2 (mm), the length expansion ratio was calculated by the following formula:

Length expansion ratio (%)={(L2−L1)/L1}×100.

When the average diameter of the ten pellets before immersion in water is $\varphi$1 (mm) and the average diameter of the same ten pellets after immersion in water for 168 hours is $\varphi$2 (mm), the diameter expansion ratio was calculated by the following formula:

Diameter expansion ratio (%)={($\varphi$2−$\varphi$1)/$\varphi$1}×100.

When the length expansion ratio (%) is $\Delta$L and the diameter expansion ratio (%) is $\Delta\varphi$, the volume expansion ratio was calculated by the following formula:

Volume expansion ratio (%)=(1+$\Delta\varphi$/100)$^2$×(1+$\Delta$L/100)×100.

[pH]

Each solid fuel was immersed in water at solid-liquid ratio of 1:3, and pH values were measured.

[Moisture Content of the Solid After Immersion in Water]

The solid fuel of each Example was immersed in water, taken out after 168 hours, and the moisture on the solid surface was wiped with a waste cloth to measure moisture content of the solid. The moisture content was calculated by the formula:

100×(weight of the solid after immersion in water−dry weight of the solid after immersion in water)/weight of the solid after immersion in water.

[Mechanical Durability After Immersion in Water]

Mechanical durability of each example pellet after immersion in water for 168 hours was measured by the same method as before immersion in water.

Tables 1 and 2 show the results of Examples a1 to a4 and Comparative Example a by the above measuring method. In Examples a1 to a4, properties were altered by heating in Examples a1 to a4, and HGI values (based on JIS M 8801) were higher than that of Comparative Examples a (WP: unheated biomass solid fuel after molding). A typical HGI value for coal (bituminous coal) is around 50, and pulverizing properties of Examples a1 to a4 are closer to coal and better than Comparative Example a.

With respect to the mechanical durability (DU), in Examples a1 to a4 (PBT) that have experienced the heating step, the strength did not substantially decrease, and powdering hardly occurred even compared with Comparative Example a before water immersion (WP), and thus it is indicated that the handleability was maintained. The mechanical durability of the solid fuel of Comparative Example a could not be measured because it was disintegrated by immersion in water.

Table 1 and FIG. 1 show that the BET specific surface area increased with the rise in the heating temperature and the pores developed with heating (thermal decomposition). In addition, the average pore diameter becomes smaller with the increase in heating temperature as in Example a1 and subsequent Examples, indicating that a large number of finer pores were generated. This is believed to be due to decomposition of cellulose.

COD of Comparative Example a (WP: biomass solid fuel obtained by only molding without heating step) is high, i.e. approximately 1100 ppm. In contrast, COD values of the biomass solid fuels that have been heated at 250° C. or higher are 1000 ppm or less, indicating that the elution of tar component is low. Accordingly, it is shown that the biomass solid fuels of Examples a2 to a4 are fuels having excellent handling properties because the elution of tar component is low even during outdoor storage. The COD values of the biomass solid fuels of Examples a1 (230° C.) is 2200 ppm. This is presumably because the tar component in the raw material remains without being volatilized due to the relatively low carbonization temperature, and tar component is readily eluted due to decomposition of cellulose (cell wall and the like) by carbonization. This is indicated by the fact that the volatile matter and heat yield are significantly higher in Example a1 than in Example a2, and thus it is an excellent fuel in terms of ignitability and heating value.

Although slightly low values are observed for Example a1 and Example a2, pH values are approximately about 6 in all of Examples a1 to a4, indicating that no particular problem occurs concerning pH values of the discharged water when Examples a1 to a4 are stored outdoor.

From the results of the ball mill grindability of Examples a1 to a4 and Comparative Example a, it was confirmed that the pulverizing point increases as the heating temperature increases.

The solid fuel of Comparative Example a (WP) was disintegrated by immersion in water, and the measurement of moisture content of the solid was impossible. In contrast, it can be considered that the results of Example a1 to Example a4 (PBT) were obtained because elution and solidification of organic ingredients such as tar associated with heating made the surface of the biomass solid fuel hydrophobic, indicating that Examples a1 to a4 (PBT) have advantageous properties as a solid fuel which is often stored outdoors. Since each solid fuel a1 to a4 is in a pellet form which has been compacted mainly in the radial direction and therefore the expansion in the radial direction becomes large, (which is the same as Example b and Example c). It is shown that the expansion ratios in Examples a2 to a4 are particularly low.

From the results of Examples a1 to a4 and Comparative Example a, by conducting a heating step after a molding step to produce, the biomass solid fuel (PBT) can be obtained with low cost, in which COD reduction, improvement in grindability, reduction of water absorption, improvement in solid strength and improvement in yield have been achieved.

Example b: Acacia

In Examples b1 to b4 (PBT), except for using acacia as a biomass raw material, the biomass raw material was heated to target temperatures (heating temperatures described in Table 1) in the same manner as Examples a1 to a4. The properties of the resulting biomass solid fuel b (Examples b1 to b4) obtained after the heating step were measured in the same manner as the above Example a. Tables 1 and 2 show the results. In Comparative Example b (WP), the properties thereof were measured using the same raw materials as in Examples b1 to b4 except that the heating step was not carried out. A binder is not used in Examples b1 to b4 and Comparative Example b, as is in Example a. Since the moisture contents after immersion in water are those after immersion for 168 hours, the moisture content in the solid fuel b is considered to have substantially reached equilibrium.

Comparative Example b disintegrated immediately after immersion in water. In contrast, in Examples b1 to b4, the bonding or adhesion between pulverized biomass particles are maintained even after immersion in water (168 hours), and they did not disintegrate. Thus, since solid forms were maintained even after immersion, measurement of moisture content was possible, and thus the generation of water resistance was confirmed. This indicates that Examples b1 to b4 have advantageous properties as a solid fuel which is often stored outdoors. From the results of HGI and ball mill grindability, it was shown that the grindability was improved in Examples b1 to b4 as compared with Comparative Example b. With respect to COD, COD was reduced in Examples b2, b3 and b4 as compared with Comparative Example b. From the viewpoints of water resistance (moisture content after immersion, expansion ratio), solid yield, mechanical durability and the like, Examples b1 to b3 are excellent, and solid fuels of Example b2 and Example b3 showed particularly excellent properties. In addition, it was shown that the expansion ratios are particularly low in Examples b2 to b4.

Example c: Meranti

In Examples c1 to c4 (PBT), except for using meranti as a biomass raw material, the biomass raw material was heated to target temperatures (heating temperatures described in Table 1) in the same manner as Examples a1 to a4. Table 1 and Table 2 show the properties of the resulting biomass solid fuel c obtained after the heating step. In Comparative Example c (WP), the properties thereof were measured using the same raw materials as in Examples c1 to c4 except that the heating step was not carried out. Similar to Example a, since the moisture contents after immersion in water are those after immersion for 168 hours, the moisture content in the solid fuel is considered to have substantially reached equilibrium. A binder is not used in Examples c1 to c4 and Comparative Example c. The method of measuring each property of the biomass solid fuel is the same as in the above Example a.

Comparative Example c disintegrated immediately after immersion in water. In contrast, in Examples c1 to c4, the bonding or adhesion between pulverized biomass particles are maintained even after immersion in water, and they did not disintegrate and water resistance is improved. From the results of HGI and ball mill grindability, it was shown that the grindability was improved in Examples c1 to c4 as compared with Comparative Example c. With respect to COD, COD was reduced in Examples c1 to c4 as compared with Comparative Example c1. From the viewpoints of COD, mechanical durability and solid yield, Examples c1 to c3 are excellent, and Examples c2 and c3 are particularly excellent. In addition, it was shown that the expansion ratios were particularly low in Examples c2 to a4.

TABLE 1

| tree species of raw materials | Example | heating temperature °C. | solid yield (dry) wt % | thermal yield % | FC wt %-AD | VM wt %-AD | fuel ratio FC/VM | HHV kcal/kg-dry | O wt %-dry | H wt %-dry | C wt %-dry | O/C (molar ratio) | H/C (molar ratio) | HGI | HGI ratio |
|---|---|---|---|---|---|---|---|---|---|---|---|---|---|---|---|
| rubber (Example a) | Comp-Ex. a | 25 | 100.0 | 100.0 | 13.0 | 74.3 | 0.17 | 4,613 | 43.6 | 5.6 | 48.4 | 0.68 | 1.39 | 18 | 1.00 |
| | Ex. a1 | 230 | 94.2 | 97.6 | 15.4 | 74.9 | 0.21 | 4,777 | 42.5 | 5.7 | 49.7 | 0.64 | 1.38 | 35 | 1.94 |
| | Ex. a2 | 250 | 82.4 | 90.8 | 20.3 | 71.2 | 0.29 | 5,081 | 39.1 | 5.7 | 53.0 | 0.55 | 1.29 | 45 | 2.50 |
| | Ex. a3 | 270 | 71.6 | 83.6 | 25.8 | 65.8 | 0.39 | 5,385 | 35.9 | 5.6 | 56.1 | 0.48 | 1.20 | 49 | 2.72 |
| | Ex. a4 | 300 | 43.1 | 62.6 | 50.3 | 41.3 | 1.22 | 6,702 | 21.3 | 4.8 | 70.2 | 0.23 | 0.82 | 65 | 3.61 |

TABLE 1-continued

| tree species of raw materials | Example | heating temperature ° C. | solid yield (dry) wt % | thermal yield % | FC wt %-AD | VM wt %-AD | fuel ratio FC/VM | HHV kcal/kg-dry | O wt %-dry | H wt %-dry | C wt %-dry | O/C (molar ratio) | H/C (molar ratio) | HGI | HGI ratio |
|---|---|---|---|---|---|---|---|---|---|---|---|---|---|---|---|
| acacia (Example b) | Comp-Ex. b | 25 | 100.0 | 100.0 | 14.8 | 72.7 | 0.20 | 4,780 | 42.3 | 5.5 | 50.2 | 0.63 | 1.31 | 18 | 1.00 |
| | Ex. b1 | 230 | 94.0 | 98.3 | 16.5 | 74.5 | 0.22 | 5,000 | 40.8 | 5.5 | 52.0 | 0.59 | 1.27 | 43 | 2.39 |
| | Ex. b2 | 250 | 85.7 | 93.7 | 20.2 | 72.1 | 0.28 | 5,225 | 38.2 | 5.5 | 54.6 | 0.52 | 1.21 | 52 | 2.89 |
| | Ex. b3 | 270 | 77.1 | 88.3 | 24.3 | 68.9 | 0.35 | 5,477 | 36.0 | 5.5 | 56.7 | 0.48 | 1.16 | 55 | 3.06 |
| | Ex. b4 | 300 | 53.3 | 71.6 | 42.1 | 51.2 | 0.82 | 6,417 | 25.7 | 5.1 | 66.8 | 0.29 | 0.92 | 62 | 3.44 |
| meranti (Example c) | Comp-Ex. c | 25 | 100.0 | 100.0 | 13.7 | 74.3 | 0.18 | 4,759 | 42.2 | 5.5 | 50.6 | 0.63 | 1.30 | 23 | 1.00 |
| | Ex. c1 | 230 | 95.0 | 99.4 | 16.0 | 74.7 | 0.21 | 4,978 | 40.8 | 5.6 | 51.8 | 0.59 | 1.30 | 33 | 1.43 |
| | Ex. c2 | 250 | 87.0 | 94.3 | 19.1 | 72.6 | 0.26 | 5,156 | 38.6 | 5.7 | 54.0 | 0.54 | 1.27 | 41 | 1.78 |
| | Ex. c3 | 270 | 78.8 | 89.4 | 23.4 | 68.3 | 0.34 | 5,398 | 36.2 | 5.5 | 56.5 | 0.48 | 1.17 | 55 | 2.39 |
| | Ex. c4 | 300 | 56.4 | 74.0 | 40.0 | 51.9 | 0.77 | 6,247 | 27.0 | 5.1 | 65.4 | 0.31 | 0.94 | 66 | 2.87 |

Comp-Ex. = Comparative Example
Ex. = Example
FC = fixed carbon (air dried basis)
VM = volatile matter (air dried basis)
HHV = dry-basis higher heating value
AD = air dried basis
dry = dry-basis

TABLE 2

| | | before immersion in water | | | | | | | |
|---|---|---|---|---|---|---|---|---|---|
| tree species of raw materials | Example | ball mill grindability point | initial dimension diameter (φ1) mm | initial dimension length (L1) mm | mechanical durability (DU) % | bulk density kg/L | bulk density ratio | BET specific surface area m²/g | average pore diameter nm | total pore volume cm³/g |
| rubber (Example a) | Comp-Ex. a | 16.7 | 9.2 | 46.1 | 95.6 | 0.605 | 1.0 | 0.426 | 25.0 | 0.00266 |
| | Ex. a1 | 43.7 | 9.1 | 29.2 | 94.9 | 0.609 | 1.0 | 0.439 | 20.1 | 0.00221 |
| | Ex. a2 | 84.3 | 8.8 | 28.3 | 94.5 | 0.560 | 0.9 | 0.467 | 18.6 | 0.00218 |
| | Ex. a3 | 96.1 | 8.4 | 28.1 | 91.6 | 0.522 | 0.9 | 0.481 | 17.5 | 0.00210 |
| | Ex. a4 | 99.0 | 7.8 | 28.5 | 78.3 | 0.429 | 0.7 | 0.715 | 16.2 | 0.00290 |
| acacia (Example b) | Comp-Ex. b | 5.3 | 8.1 | 22.4 | 98.3 | 0.723 | 1.0 | 0.313 | 24.0 | 0.00188 |
| | Ex. b1 | 25.8 | 7.9 | 25.1 | 97.2 | 0.684 | 0.9 | 0.378 | 22.4 | 0.00212 |
| | Ex. b2 | 72.9 | 7.7 | 22.9 | 95.2 | 0.656 | 0.9 | 0.412 | 20.5 | 0.00211 |
| | Ex. b3 | 96.1 | 7.5 | 22.7 | 93.2 | 0.610 | 0.8 | 0.464 | 19.4 | 0.00225 |
| | Ex. b4 | 98.8 | 7.0 | 20.2 | 84.5 | 0.495 | 0.7 | 0.552 | 17.9 | 0.00246 |
| meranti (Example c) | Comp-Ex. c | 19.6 | 8.1 | 22.6 | 98.1 | 0.776 | 1.0 | 0.296 | 26.4 | 0.00195 |
| | Ex. c1 | 51.9 | 8.0 | 31.3 | 97.2 | 0.737 | 0.9 | 0.330 | 28.6 | 0.00236 |
| | Ex. c2 | 90.0 | 7.9 | 32.1 | 96.2 | 0.703 | 0.9 | 0.351 | 28.5 | 0.00251 |
| | Ex. c3 | 97.8 | 7.8 | 28.4 | 94.5 | 0.661 | 0.9 | 0.352 | 26.3 | 0.00231 |
| | Ex. c4 | 99.2 | 7.2 | 24.6 | 88.0 | 0.558 | 0.7 | 0.406 | 23 | 0.00233 |

| | | after immersion in water | | | | | | |
|---|---|---|---|---|---|---|---|---|
| tree species of raw materials | Example | COD mg/L | diameter (φ2) mm | length (L2) mm | diameter expansion ratio % | length expansion ratio % | pH | moisture content of solid 168 h wt % | mechanical durability (DU) % |
| rubber (Example a) | Comp-Ex. a | 1100 | disintegration | | | | | | |
| | Ex. a1 | 2200 | 10.5 | 31.1 | 15.4 | 6.6 | 4.89 | 40.4 | 85.2 |
| | Ex. a2 | 1000 | 9.1 | 28.6 | 3.4 | 1.0 | 5.18 | 32.4 | 94.4 |

TABLE 2-continued

|  |  |  |  |  |  |  |  |  |  |
|---|---|---|---|---|---|---|---|---|---|
|  | Ex. a3 | 460 | 8.7 | 28.3 | 3.2 | 0.5 | 5.76 | 30.6 | 92.3 |
|  | Ex. a4 | 110 | 7.9 | 29.2 | 1.8 | 2.5 | 7.74 | 20.5 | 83.0 |
| acacia | Comp- | 310 |  |  |  | disintegration |  |  |  |
| (Example | Ex. b |  |  |  |  |  |  |  |  |
| b) | Ex. b1 | 400 | 8.6 | 25.7 | 9.1 | 2.7 | 4.77 | 24 | 96.2 |
|  | Ex. b2 | 300 | 8.0 | 23.2 | 4.1 | 1.2 | 4.95 | 21.1 | 96.1 |
|  | Ex. b3 | 200 | 7.7 | 23.5 | 3.3 | 3.5 | 5.29 | 21.3 | 94.6 |
|  | Ex. b4 | 47 | 7.1 | 20.5 | 1.3 | 1.7 | 6.47 | 19.2 | 86.7 |
| meranti | Comp- | 560 |  |  |  | disintegration |  |  |  |
| (Example | Ex. c |  |  |  |  |  |  |  |  |
| c) | Ex. c1 | 460 | 8.8 | 32.9 | 9.5 | 5.0 | 5.06 | 25.3 | 92.5 |
|  | Ex. c2 | 250 | 8.2 | 32.6 | 3.8 | 1.4 | 5.4 | 19.5 | 96.4 |
|  | Ex. c3 | 120 | 8.0 | 28.6 | 2.6 | 0.7 | 5.69 | 17.9 | 96.0 |
|  | Ex. c4 | 43 | 7.4 | 24.8 | 2.7 | 1.0 | 5.85 | 16.8 | 90.1 |

Ex. = Example
Comp-Ex. = Comparative Example

Example d: Eucalyptus

In Examples d1 to d4 (PBT), except that eucalyptus was used as a biomass raw material and was molded into a pellet shape having a diameter of 6 mm in the molding step, the biomass raw material was heated to target temperatures (heating temperatures described in Table 3) in the same manner as Examples a1 to a4. The properties of the resulting biomass solid fuel d (Examples d1 to d4) obtained after the heating step were measured in the same manner as the above Example a. Tables 3 and 4 show the results. In Comparative Example d (WP), the properties thereof were measured using the same raw materials as in Examples d1 to d4 except that the heating step was not carried out. A binder is not used in Examples d1 to d4 and Comparative Example d, as is in Example a. Since the moisture contents after immersion in water are those after immersion for 168 hours, the moisture content in the solid fuel d is considered to have substantially reached equilibrium.

Comparative Example d disintegrated immediately after immersion in water. In contrast, in Examples d1 to d4, the bonding or adhesion between pulverized biomass particles are maintained even after immersion in water (168 hours), and they did not disintegrate. Thus, since solid forms were maintained even after immersion, measurement of moisture content was possible, and thus the generation of water resistance was confirmed. This indicates that Examples d1 to d4 have advantageous properties as a solid fuel which is often stored outdoors. From the results of HGI and ball mill grindability, it was shown that the grindability was improved in Examples d1 to d4 as compared with Comparative Example d. With respect to COD, COD was reduced in Examples d1 to d4 as compared with Comparative Example d. From the viewpoints of water resistance (moisture content after immersion, expansion ratio), solid yield, mechanical durability and the like, Examples d1 to d3 are excellent, and solid fuels of Example d2 and Example d3 showed particularly excellent properties. In addition, it was shown that the expansion ratios are particularly low in Examples d2 to d4.

Example e: Teak

In Examples e1 to e4 (PBT), except for using teak as a biomass raw material, the biomass raw material was heated to target temperatures (heating temperatures described in Table 3) in the same manner as Examples a1 to a4. The properties of the resulting biomass solid fuel e (Examples e1 to e4) obtained after the heating step were measured in the same manner as the above Example a. Tables 3 and 4 show the results. In Comparative Example e (WP), the properties thereof were measured using the same raw materials as in Examples e1 to e4 except that the heating step was not carried out. A binder is not used in Examples e1 to e4 and Comparative Example e, as is in Example a. Since the moisture contents after immersion in water are those after immersion for 168 hours, the moisture content in the solid fuel b is considered to have substantially reached equilibrium.

Comparative Example e disintegrated immediately after immersion in water. In contrast, in Examples e1 to e4, the bonding or adhesion between pulverized biomass particles are maintained even after immersion in water (168 hours), and they did not disintegrate. Thus, since solid forms were maintained even after immersion, measurement of moisture content was possible, and thus the generation of water resistance was confirmed. This indicates that Examples e1 to e4 have advantageous properties as a solid fuel which is often stored outdoors. From the results of HGI and ball mill grindability, it was shown that the grindability was improved in Examples e1 to e4 as compared with Comparative Example e. With respect to COD, COD was reduced in Examples e1 to e4 as compared with Comparative Example e. From the viewpoints of water resistance (moisture content after immersion, expansion ratio), solid yield, mechanical durability and the like, Examples e1 to e3 are excellent, and solid fuels of Example e2 and Example e3 showed particularly excellent properties. In addition, it was shown that the expansion ratios are particularly low in Examples e2 to e4.

Example f: Mixture of Larch, Spruce and Birch

In Examples f1 to f3 (PBT), except for using a mixture of 50 wt % of larch, 45 wt % of spruce and 5 wt % of birch as a biomass raw material, the biomass raw material was heated to target temperatures (heating temperatures described in Table 3) in the same manner as Examples a1 to a4. The properties of the resulting biomass solid fuel f (Examples f1 to f3) obtained after the heating step were measured in the same manner as the above Example a. Tables 3 and 4 show the results. In Comparative Example f (WP), the properties thereof were measured using the same raw materials as in Examples f1 to f3 except that the heating step was not carried out. A binder is not used in Examples f1 to f3 and Comparative Example f, as is in Example a. Since the moisture contents after immersion in water are those after immersion for 168 hours, the moisture content in the solid fuel f is considered to have substantially reached equilibrium.

Comparative Example f disintegrated immediately after immersion in water. In contrast, in Examples f1 to f3, the bonding or adhesion between pulverized biomass particles are maintained even after immersion in water (168 hours), and they did not disintegrate. Thus, since solid forms were maintained even after immersion, measurement of moisture content was possible, and thus the generation of water resistance was confirmed. This indicates that Examples f1 to f3 have advantageous properties as a solid fuel which is often stored outdoors. From the results of HGI and ball mill grindability, it was shown that the grindability was improved in Examples f1 to f3 as compared with Comparative Example f. With respect to COD, COD was reduced in Examples f1 to f3 as compared with Comparative Example f. From the viewpoints of water resistance (moisture content after immersion, expansion ratio), solid yield, mechanical durability and the like, Examples f1 to f3 are excellent, and solid fuels of Example f2 and Example f3 showed particularly excellent properties. In addition, it was shown that the expansion ratios are particularly low in Examples f2 to f3.

TABLE 3

| tree species of raw materials | Example | heating temperature | solid yield (dry) | thermal yield | FC | VM | fuel ratio FC/VM | HHV | O | H | C | O/C (molar ratio) | H/C (molar ratio) | HGI | HGI ratio |
|---|---|---|---|---|---|---|---|---|---|---|---|---|---|---|---|
| | | °C. | wt % | % | wt %-AD | wt %-AD | | kcal/kg-dry | wt %-dry | wt %-dry | wt %-dry | | | | |
| eucalyptus (Example d) | Comp-Ex. d | 25 | 100.0 | 100.0 | 13.0 | 75.5 | 0.17 | 4,687 | 44.0 | 5.2 | 49.8 | 0.66 | 1.25 | 20 | 1.00 |
| | Ex. d1 | 230 | 92.3 | 98.2 | 16.4 | 75.6 | 0.22 | 4,984 | 41.6 | 5.1 | 52.2 | 0.60 | 1.17 | 34 | 1.70 |
| | Ex. d2 | 240 | 86.7 | 94.7 | 19.0 | 73.9 | 0.26 | 5,118 | 40.1 | 5.2 | 53.6 | 0.56 | 1.16 | 33 | 1.65 |
| | Ex. d3 | 250 | 79.9 | 90.8 | 22.7 | 70.1 | 0.32 | 5,326 | 37.7 | 5.3 | 56.0 | 0.50 | 1.14 | 35 | 1.75 |
| | Ex. d4 | 270 | 69.0 | 83.5 | 29.5 | 63.2 | 0.47 | 5,672 | 34.0 | 5.1 | 59.7 | 0.43 | 1.03 | 42 | 2.10 |
| teak (Example e) | Comp-Ex. e | 25 | 100.0 | 100.0 | 15.7 | 69.9 | 0.22 | 4,552 | 42.0 | 5.3 | 47.9 | 0.66 | 1.33 | 20 | 1.00 |
| | Ex. e1 | 230 | 92.3 | 96.9 | 18.2 | 69.9 | 0.26 | 4,776 | 39.7 | 5.3 | 50.4 | 0.59 | 1.26 | 22 | 1.10 |
| | Ex. e2 | 240 | 87.0 | 93.7 | 20.4 | 68.6 | 0.30 | 4,903 | 38.1 | 5.3 | 51.8 | 0.55 | 1.23 | 29 | 1.45 |
| | Ex. e3 | 250 | 80.5 | 89.7 | 24.1 | 65.4 | 0.37 | 5,069 | 35.9 | 5.3 | 53.6 | 0.50 | 1.19 | 33 | 1.65 |
| | Ex. e4 | 270 | 70.0 | 82.9 | 29.8 | 59.6 | 0.50 | 5,389 | 32.4 | 5.1 | 57.0 | 0.43 | 1.07 | 39 | 1.95 |
| larch + spruce + birch (Example f) | Comp-Ex. f | 25 | 100.0 | 100.0 | 12.4 | 75.8 | 0.16 | 4,752 | 43.7 | 5.5 | 50.4 | 0.65 | 1.31 | 17 | 1.00 |
| | Ex. f1 | 230 | 93.7 | 97.4 | 13.3 | 77.1 | 0.17 | 4,939 | 42.8 | 5.3 | 51.4 | 0.62 | 1.24 | 21 | 1.24 |
| | Ex. f2 | 250 | 89.2 | 95.3 | 15.6 | 76.3 | 0.20 | 5,076 | 41.3 | 5.5 | 52.8 | 0.59 | 1.25 | 22 | 1.29 |
| | Ex. f3 | 270 | 79.6 | 90.3 | 20.6 | 72.3 | 0.28 | 5,391 | 38.5 | 5.4 | 55.6 | 0.52 | 1.17 | 32 | 1.88 |

Comp-Ex. = Comparative Example
Ex. = Example
FC = fixed carbon (air dried basis)
VM = volatile matter (air dried basis)
HHV = dry-basis higher heating value
AD = air dried basis
dry = dry-basis

TABLE 4

| | | before immersion in water | | | | | | | | |
|---|---|---|---|---|---|---|---|---|---|---|
| tree species of raw materials | Example | ball mill grindability | initial dimension diameter (φ1) | initial dimension length (L1) | mechanical durability (DU) | bulk density | bulk density ratio | BET specific surface area | average pore diameter | total pore volume |
| | | point | mm | mm | % | kg/L | | m²/g | nm | cm³/g |
| eucalyptus (Example d) | Comp-Ex. d | 15.4 | 6.2 | 28.3 | 97.1 | 0.752 | 1.0 | 0.134 | 28.1 | 0.00094 |
| | Ex. d1 | 64.8 | 6.1 | 21.8 | 95.9 | 0.738 | 1.0 | 0.161 | 25.1 | 0.00101 |
| | Ex. d2 | 81.4 | 6.1 | 22.8 | 95.4 | 0.715 | 1.0 | 0.170 | 24.8 | 0.00105 |
| | Ex. d3 | 94.2 | 5.9 | 25.4 | 94.1 | 0.698 | 0.9 | 0.182 | 21.7 | 0.00099 |
| | Ex. d4 | 97.4 | 5.7 | 21.6 | 92.4 | 0.645 | 0.9 | 0.197 | 19.4 | 0.00096 |
| teak (Example e) | Comp-Ex. e | 18.0 | 8.4 | 28.7 | 98.6 | 0.678 | 1.0 | 0.351 | 46.9 | 0.00411 |
| | Ex. e1 | 42.2 | 8.3 | 27.1 | 98.0 | 0.642 | 0.9 | 0.424 | 39.0 | 0.00414 |
| | Ex. e2 | 70.9 | 8.2 | 28.7 | 97.3 | 0.631 | 0.9 | 0.438 | 38.4 | 0.00420 |
| | Ex. e3 | 87.9 | 8.0 | 26.6 | 96.6 | 0.608 | 0.9 | 0.479 | 36.7 | 0.00439 |
| | Ex. e4 | 98.1 | 7.8 | 27.6 | 94.7 | 0.570 | 0.8 | 0.494 | 24.0 | 0.00297 |
| larch + spruce + birch (Example f) | Comp-Ex. f | 7.7 | 8.1 | 22.6 | 99.5 | 0.713 | 1.0 | 0.113 | 18.6 | 0.00053 |
| | Ex. f1 | 26.8 | 7.8 | 22.9 | 99.0 | 0.685 | 1.0 | 0.161 | 19.4 | 0.00078 |
| | Ex. f2 | 50.5 | 7.8 | 22.9 | 98.4 | 0.662 | 0.9 | 0.199 | 20.8 | 0.00104 |
| | Ex. f3 | 88.9 | 7.7 | 22.8 | 97.0 | 0.619 | 0.9 | 0.218 | 18.1 | 0.00099 |

TABLE 4-continued

| tree species of raw materials | Example | after immersion in water ||||||| moisture content of solid 168 h | mechanical durability (DU) |
|---|---|---|---|---|---|---|---|---|---|---|
| | | COD | time | diameter (φ2) | length (L2) | diameter expansion ratio | length expansion ratio | pH | | |
| | | mg/L | h | mm | mm | % | % | | wt % | % |
| *eucalyptus* (Example d) | Comp-Ex. d | 950 | 168 | | | disintegration ||||  |
| | Ex. d1 | 730 | 168 | 6.5 | 22.8 | 6.7 | 4.8 | 4.79 | 23.1 | 94.1 |
| | Ex. d2 | 580 | 168 | 6.3 | 23.0 | 3.4 | 1.2 | 4.91 | 20.4 | 95.9 |
| | Ex. d3 | 340 | 168 | 6.1 | 26.1 | 3.0 | 2.9 | 5.65 | 17.8 | 95.5 |
| | Ex. d4 | 110 | 168 | 5.9 | 22.1 | 2.4 | 2.3 | 6.25 | 18.4 | 94.7 |
| teak (Example e) | Comp-Ex. e | 2000 | 168 | | | disintegration ||||  |
| | Ex. e1 | 1300 | 168 | 9.3 | 28.3 | 11.3 | 4.1 | 6.15 | 29.9 | 96.6 |
| | Ex. e2 | 890 | 168 | 8.6 | 29.1 | 5.4 | 1.4 | 6.04 | 26.8 | 97.6 |
| | Ex. e3 | 600 | 168 | 8.3 | 26.7 | 4.1 | 0.5 | 6.45 | 20.5 | 97.1 |
| | Ex. e4 | 260 | 168 | 8.0 | 27.8 | 2.8 | 1.0 | 7.16 | 24.2 | 96.1 |
| larch + spruce + birch (Example f) | Comp-Ex. f | 3600 | 168 | | | disintegration ||||  |
| | Ex. f1 | 950 | 168 | 8.8 | 24.0 | 12.4 | 5.0 | 4.95 | 28.6 | 98.4 |
| | Ex. f2 | 740 | 168 | 8.2 | 23.6 | 5.7 | 3.1 | 4.95 | 23.4 | 98.7 |
| | Ex. f3 | 330 | 168 | 7.9 | 23.0 | 3.0 | 0.9 | 5.13 | 21.4 | 97.8 |

Comp-Ex. = Comparative Example
Ex. = Example

<Disintegration Test>

Figure 14:
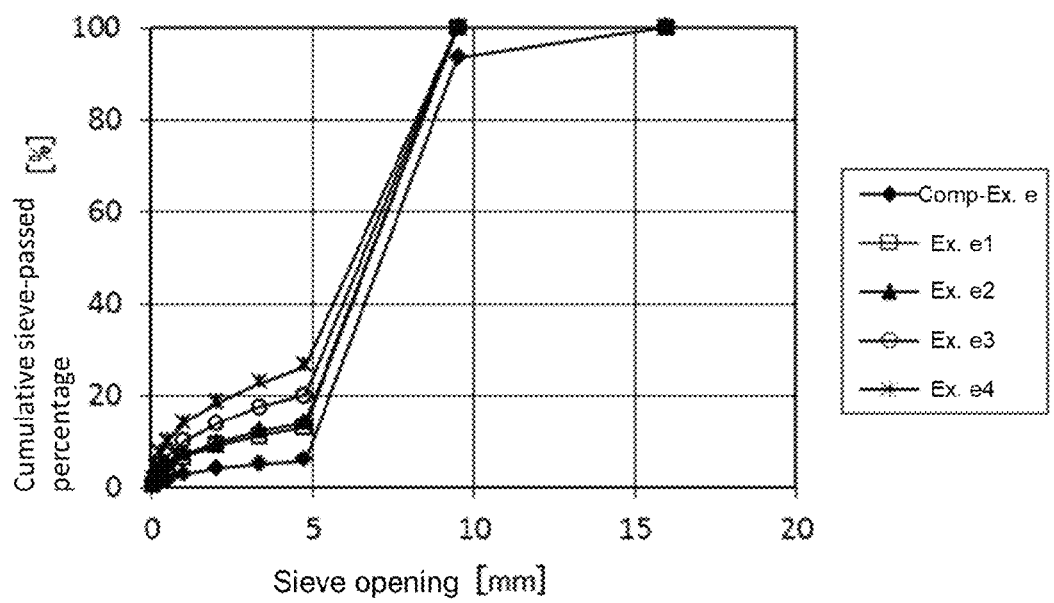
FIG. 14 is a graph showing the results of disintegration test of the solid fuel e.
Figure 15:
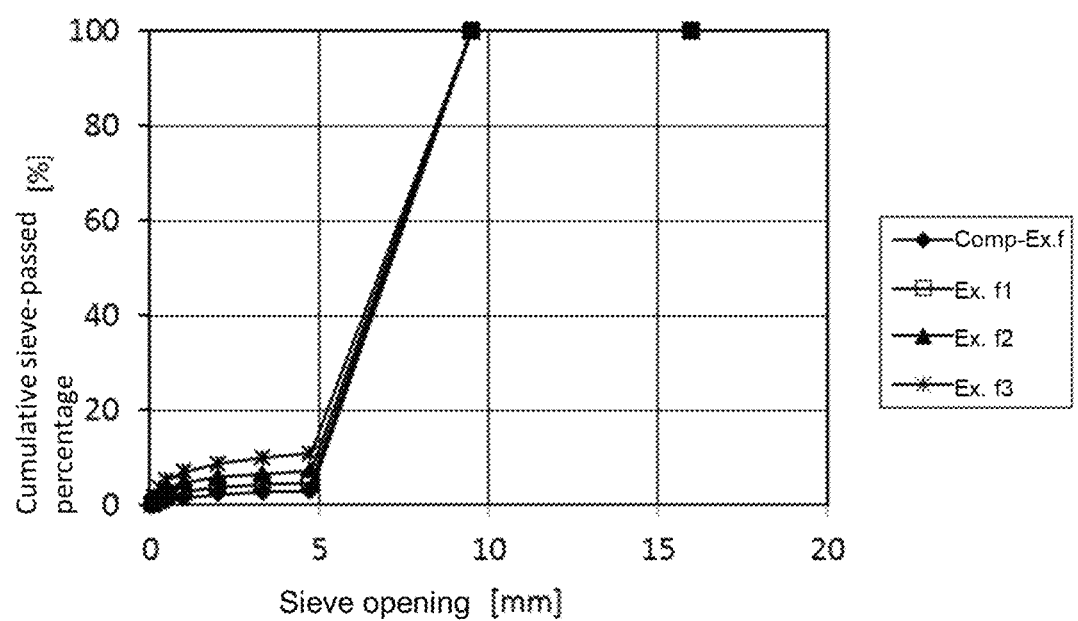
FIG. 15 is a graph showing the results of disintegration test of the solid fuel f.

A disintegration test was carried out on the solid fuel whose raw material is cheek in Example e and the solid fuel whose raw material is a mixture of larch, spruce and birch in Example f. Table 5 shows cumulative sieve-passed percentage of the biomass solid fuel e or f after subjected to the disintegration test, and FIGS. 14 and 15 show a particle size distribution diagram. In order to evaluate the handling characteristics of the pellets, disintegration test was performed. 1 kg of sample was packed into a plastic bag and was dropped 20 times from a height of 8.6 m, and subjected to rotational strength test based on JIS Z 8841, to measure the particle size distribution. The resulting particle size distribution is shown in FIGS. 14 and 15. Herein, a sample having a particle size distribution in which an amount of 2 mm sieve-passed particles is 30 wt % or less and an amount of 0.5 mm sieve-passed particles is 15 wt % or less, is determined as a sample having a handleable particle size in transportation, storage and the like. The results of Table 5 and FIGS. 14 and 15 show that while the sample particle size after rotation strength test has become finer as the heating temperature becomes higher, all samples clear the evaluation criteria described above and therefore they are handleable without any problem.

TABLE 5

| Sieve opening mm | Example e: teak ||||| Example f: larch + spruce + birch |||||
|---|---|---|---|---|---|---|---|---|---|
| | Comp-Ex. e | Ex. e 1 | Ex. e 2 | Ex. e 3 | Ex. e 4 | Comp-Ex. f | Ex. f 1 | Ex. f 2 | Ex. f 3 |
| 16 | 100.0 | 100.0 | 100.0 | 100.0 | 100.0 | 100.0 | 100.0 | 100.0 | 100.0 |
| 9.5 | 93.5 | 100.0 | 100.0 | 100.0 | 100.0 | 100.0 | 100.0 | 100.0 | 100.0 |
| 4.75 | 5.8 | 13.1 | 14.1 | 20.0 | 26.4 | 3.0 | 4.8 | 7.3 | 10.9 |
| 3.35 | 4.9 | 11.3 | 12.2 | 17.4 | 22.6 | 2.8 | 4.5 | 6.5 | 10.0 |
| 2 | 4.0 | 9.2 | 9.7 | 14.0 | 18.3 | 2.3 | 3.8 | 5.8 | 8.7 |
| 1 | 2.8 | 6.5 | 7.1 | 10.2 | 14.0 | 1.5 | 2.8 | 4.7 | 7.1 |
| 0.5 | 1.6 | 4.3 | 4.8 | 7.0 | 10.0 | 0.8 | 1.8 | 3.4 | 5.3 |
| 0.3 | 1.0 | 2.9 | 3.3 | 5.0 | 7.4 | 0.4 | 1.1 | 2.4 | 3.8 |
| 0.15 | 0.4 | 1.4 | 1.7 | 2.8 | 4.2 | 0.1 | 0.5 | 1.2 | 1.8 |
| 0.075 | 0.1 | 0.5 | 0.7 | 1.3 | 1.8 | 0.0 | 0.1 | 0.5 | 0.6 |

Comp-Ex. = Comparative Example
Ex. = Example
In the table, the unit of the numerical value relating to the cumulative sieve-passed percentage is "%".

<Ignitability>

Furthermore, the inventors of the present invention investigated the thermal physical properties of the biomass solid fuel of the present invention and the solid fuel obtained through a step of steam exploding biomass as described in Patent Document 1, respectively, and found out that the biomass solid fuel of the present invention is excellent in ignitability.

For the above Examples (a2), (b2) and (c2) and for Comparative Example q which is a solid fuel obtained by steam exploding a mixture of coniferous trees and broad-leaved trees as a biomass raw material and molding it into biomass blocks and then heating the biomass blocks at 250° C. (a solid fuel obtained by the production method described in Patent Document 1), thermogravimetric measurement (TG) and differential thermal analysis (DTA) were carried out. The measurement methods of TG and DTA are as follows.

<TG and DTA>

TG and DTA were measured using an analyzer STA7300 manufactured by Hitachi High-Tech Sciences for simultaneously measuring differential thermal and thermogravimetry. 5 mg of the sample whose particle size was adjusted to 45 to 90 μm with a cutter mill was heated in the above analyzer at a rate of temperature rise of 5° C./min up to 600° C. while 4 vol % of oxygen-nitrogen mixed gas was being flowed at 200 cc/min and maintained at 600° C. for 60 minutes.

Figure 12:
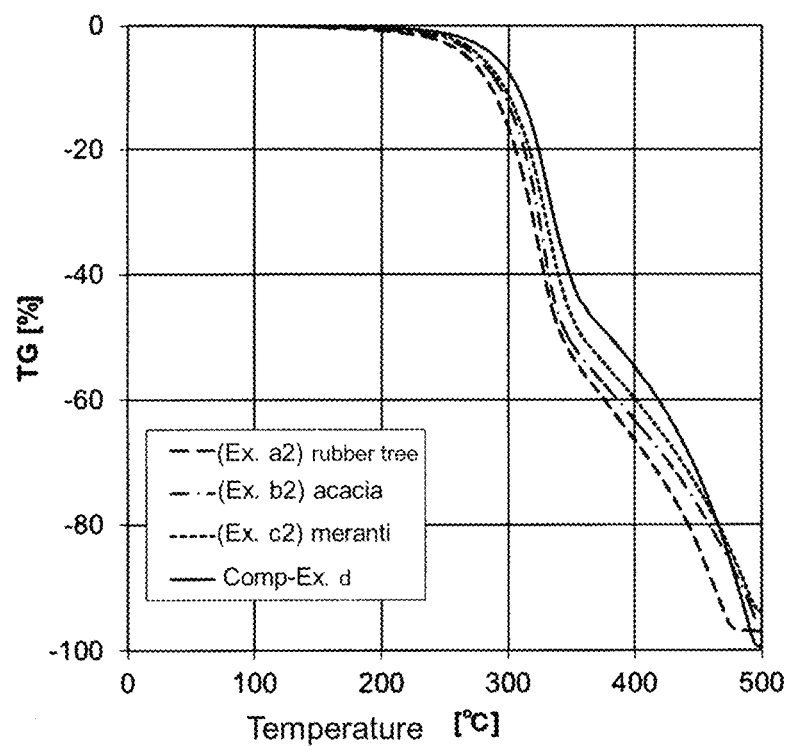
FIG. 12 is a graph showing TG of the solid fuels.
Figure 13:
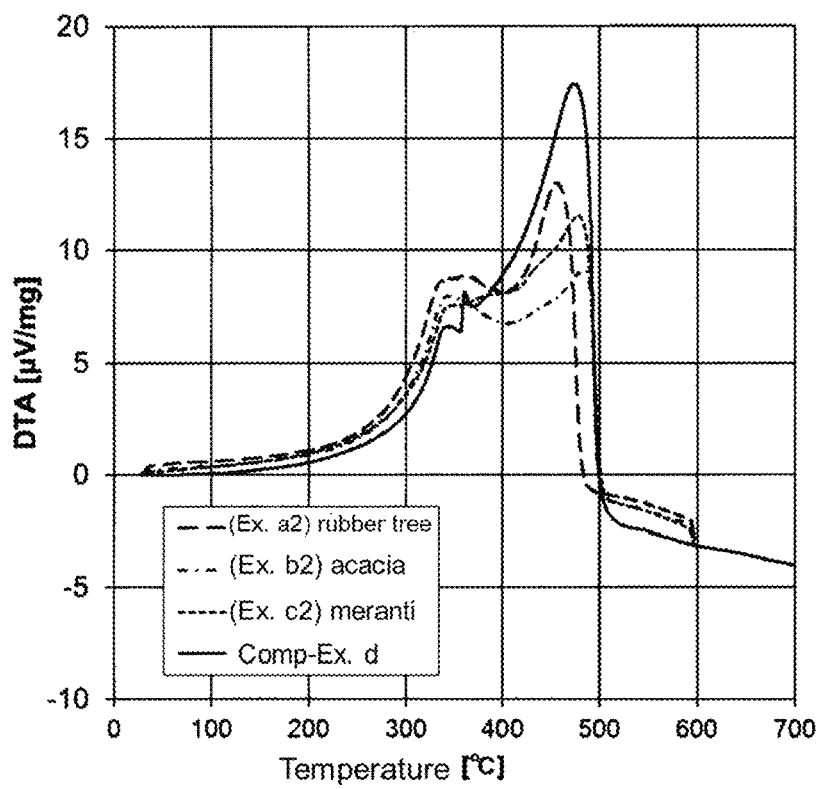
FIG. 13 is a graph showing DTA of the solid fuels.

The results are shown in FIGS. 12 and 13. From the results of TG, since Comparative Example q shows a slow weight loss, volatile matter thereof is few and thus ignitability thereof is low as compared with Example (a2), Example (b2) and Example (c2). Also, from the results of DTA, Comparative Example q shows that the heat generation occurs from the high temperature side and the ignitability is low as compared with Example (a2), Example (b2) and Example (c2). The reason for this is presumed as follows. In Comparative Example q, the biomass solid fuel is obtained by the method in the order of pulverizing and drying, steam exploding, molding and heating the biomass, and in the steam explosion, organic substances appear on the surface of the pulverized biomass particles and are volatilized by subsequent heating (carbonization). On the other hand, in the PBT of the present invention including the Examples (a2), (b2) and (c2), it is inferred that residual amounts of the volatile substances are large because of not being subjected to the explosion step.

Thus, it is presumed that since the biomass solid fuel of the present invention is obtained by the method not comprising the steam explosion step, it is excellent in ignitability in addition to cost reducing as compared with Comparative Example q.

Furthermore, it is presumed that since the residual amount of the terpenes forming solid cross-linking in PBT increases for the same reason and stronger solid crosslinking is achieved, PBT of the present invention is superior to Comparative Example q in strength and water resistance.

<FT-IR Analysis of PBT and WP>

FIGS. 5 to 9 are charts showing the results of FT-IR analysis of a biomass solid fuel r obtained from the European red pine as a raw material by the same method as the Example a2 (solid fuel (PBT) obtained by pulverizing and molding the raw material to a pellet form and heating at 250° C.). In addition, the data of unheated solid fuel (WP) obtained by pulverizing and molding the same raw material, but with no heating is also shown. Both in the outer surface of the pellet (FIG. 5) and in cross-sectional center (FIG. 6), the amount of COOH groups is WP>PBT, and the amount of C=C bonds is PBT>WP. Further, the amount of COOH group eluted into acetone extract (FIG. 7) is WP>PBT, indicating that PBT has less hydrophilic COOH groups. In addition, in the solids after acetone extraction (FIG. 8), the PBT has more C=C bonds than WP. Thus, it is understood that PBT is excellent in water resistance.

FIG. 9 is a chart showing the results of GC-MS analysis of the acetone extract solution. Solid fuel q (PBT) and unheated solid fuel (WP) were used as FIGS. 5 to 8. As shown in FIG. 9, the eluted amount of the abietic acid and the like, which is a kind of terpenes, to acetone is smaller in the case of PBT than in the case of WP. Thus, the results are considered showing that abietic acid melted by heating to form liquid cross-linkage, and solid cross-linkage was formed by the volatilization of abietic acid and the like. It is presumed that since the biomass solid fuel of the present invention is also PBT obtained by molding and heating pulverized biomass particles, PBT is excellent in water resistance by the same mechanism as the biomass solid fuel q.

<Water Absorption Distribution in PBT and PAT>

Figure 10:
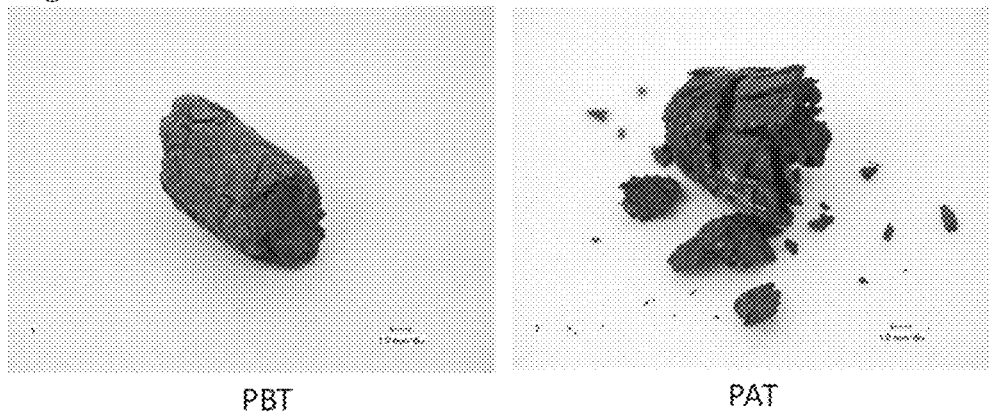
FIG. 10 is a photograph showing the shape of a pellet after the solid fuels are immersed in physiological saline solution.
Figure 11:
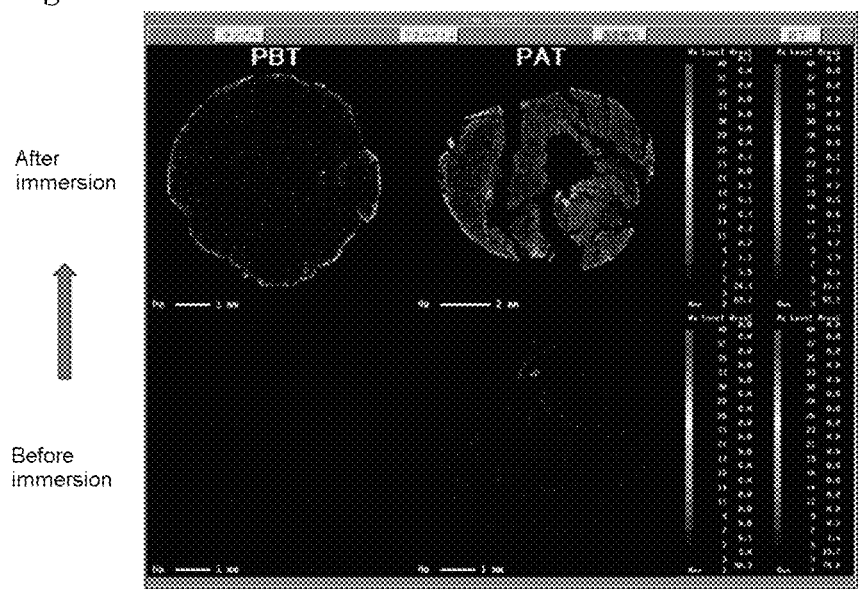
FIG. 11 is a diagram showing the distribution of sodium before and after the solid fuels are immersed in physiological saline.

In order to compare the water resistance of PAT and PBT, the inventors of the present invention examined sodium distribution of the biomass solid fuels after water absorption using saline solution. As a sample of PAT, a solid fuel obtained by heating a raw material of European red pine at 250° C. and then molding into pellets having diameter of 6 mm was used. As a sample of PBT, a solid fuel obtained by molding a raw material of European red pine into pellets having diameter of 6 mm and then heating it at 250° C. The PBT and PAT were immersed in 0.9 wt % saline solution for 5 days. As a result, as FIG. 10 shows the appearance of pellets, the PBT maintained its pellet shape (FIG. 10, left), whereas the PAT disintegrated largely (FIG. 10, right). Further, for PAT and PBT each, samples before and after immersion in 0.9 wt % saline solution for 5 days were analyzed at their cross section by EPMA (Electron Probe MicroAnalyser) analysis, to compare Na distribution. In the PBT, Na distribution remains at the surface of the pellet and does not penetrate into the inside, whereas, in the PAT, Na is widely distributed into the inside (see FIG. 11). This means that penetration of saline solution is less in the PBT than in the PAT. From this result, it is presumed that in PBT, the thermal decomposition products of extracted components make a solid cross-linking in the gap between adjacent pulverized biomass particles and become hydrophobic to prevent the penetration of water, whereas, in PAT, since water can penetrate into the gap between pulverized biomass particles, water permeates into the inside of pellets and expands the gap between pulverized biomass particles, leading to the disintegrate.

The invention claimed is:

1. A molded-then-torrefied biomass solid fuel obtained by a method comprising molding pulverized biomass particles into unheated biomass blocks and then torrefying the unheated biomass blocks in a furnace, without performing a steam explosion, wherein mutual bonding or adhesion between pulverized biomass particles is maintained after immersion in water, and wherein the molded-then-torrefied biomass solid fuel has a chemical oxygen demand (COD) of 3000 ppm or less, and wherein at least one condition selected from the group consisting of the following conditions (a3) to (f3) is satisfied:

condition (a3): the raw material of the pulverized biomass particles is rubber tree and the molded-then-torrefied biomass solid fuel has a BET specific surface area of 0.43 $m^2/g$ to 0.80 $m^2/g$;

condition (b3): the raw material of the pulverized biomass particles is acacia and the molded-then-torrefied biomass solid fuel has a BET specific surface area of 0.32 $m^2/g$ to 0.60 $m^2/g$;

condition (c3): the raw material of the pulverized biomass particles is meranti and the molded-then-torrefied biomass solid fuel has a BET specific surface area of 0.30 to 0.45 $m^2/g$;

condition (d3): the raw material of the pulverized biomass particles is *eucalyptus* and the molded-then-torrefied biomass solid fuel has a BET specific surface area of 0.135 m²/g to 0.210 m²/g;

condition (e3): the raw material of the pulverized biomass particles is teak and the molded-then-torrefied biomass solid fuel has a BET specific surface area of 0.355 m²/g to 0.550 m²/g; and condition (f3): the raw material of the pulverized biomass particles is a mixture of larch, spruce and birch and the molded-then-torrefied biomass solid fuel has a BET specific surface area of 0.150 m²/g to 0.250 m²/g.

2. The molded-then-torrefied biomass solid fuel according to claim 1, having a fuel ratio (fixed carbon/volatile matter) of 0.15 to 1.50, dry-basis higher heating value of 4500 to 7000 (kcal/kg-dry), a molar ratio of oxygen O to carbon C (O/C) of 0.1 to 0.7, and a molar ratio of hydrogen H to carbon C (H/C) is 0.70 to 1.40.

3. The molded-then-torrefied biomass solid fuel according to claim 1, having an equilibrium moisture content after immersion in water of 10 to 65 wt %.

4. The molded-then-torrefied biomass solid fuel according to claim 1, having a diameter expansion ratio after immersion in water of 20% or less.

5. The molded-then-torrefied biomass solid fuel according to claim 1, having a length expansion ratio after immersion in water of 10% or less.

6. The molded-then-torrefied biomass solid fuel according to claim 1, having a volume expansion ratio after immersion in water of 160% or less.

7. The molded-then-torrefied biomass solid fuel according to claim 1, having COD (chemical oxygen demand) of 43 ppm or more.

8. The molded-then-torrefied biomass solid fuel according to claim 1, wherein at least one condition selected from the group consisting of the following conditions (a1) to (f1) is satisfied:

condition (a1): the raw material of the pulverized biomass particles is rubber tree and the molded-then-torrefied biomass solid fuel has COD of 2200 ppm or less;

condition (b1): the raw material of the pulverized biomass particles is acacia and the molded-then-torrefied biomass solid fuel has COD of 400 ppm or less;

condition (c1): the raw material of the pulverized biomass particles is meranti and the molded-then-torrefied biomass solid fuel has COD of 460 ppm or less;

condition (d1): the raw material of the pulverized biomass particles is eucalyptus and the molded-then-torrefied biomass solid fuel has COD of 730 ppm or less;

condition (e1): the raw material of the pulverized biomass particles is teak and the molded-then-torrefied biomass solid fuel has COD of 1300 ppm or less; and condition (f1): the raw material of the pulverized biomass particles is a mixture of larch, spruce and birch and the molded-then-torrefied biomass solid fuel has COD of 950 ppm or less.

9. The molded-then-torrefied biomass solid fuel according to claim 1, wherein at least one condition selected from the group consisting of the following conditions (a2) to (f2) is satisfied:

condition (a2): the raw material of the pulverized biomass particles is rubber tree and the molded-then-torrefied biomass solid fuel has COD of 110 ppm or more;

condition (b2): the raw material of the pulverized biomass particles is acacia and the molded-then-torrefied biomass solid fuel has COD of 47 ppm or more;

condition (c2): the raw material of the pulverized biomass particles is meranti and the molded-then-torrefied biomass solid fuel has COD of 43 ppm or more;

condition (d2): the raw material of the pulverized biomass particles is eucalyptus and the molded-then-torrefied biomass solid fuel has COD of 110 ppm or more;

condition (e2): the raw material of the pulverized biomass particles is teak and the molded-then-torrefied biomass solid fuel has COD of 260 ppm or more; and condition (f2): the raw material of the pulverized biomass particles is a mixture of larch, spruce and birch and the molded-then-torrefied biomass solid fuel has COD of 330 ppm or more.

10. The molded-then-torrefied biomass solid fuel according to claim 1, wherein at least one condition selected from the group consisting of the following conditions (a4) to (f4) is satisfied:

condition (a4): the raw material of the pulverized biomass particles is rubber tree and the molded-then-torrefied biomass solid fuel has COD of 2500 ppm or less;

condition (b4): the raw material of the pulverized biomass particles is acacia and the molded-then-torrefied biomass solid fuel has COD of 400 ppm or less;

condition (c4): the raw material of the pulverized biomass particles is meranti and the molded-then-torrefied biomass solid fuel has COD of 550 ppm or less;

condition (d4): the raw material of the pulverized biomass particles is eucalyptus and the molded-then-torrefied biomass solid fuel has COD of 900 ppm or less;

condition (e4): the raw material of the pulverized biomass particles is teak and the molded-then-torrefied biomass solid fuel has COD of 1500 ppm or less; and condition (f4): the raw material of the pulverized biomass particles is a mixture of larch, spruce and birch and the molded-then-torrefied biomass solid fuel has COD of 1200 ppm or less.

11. The molded-then-torrefied biomass solid fuel according to claim 1, wherein at least one condition selected from the group consisting of the conditions (a3), (c3), (d3), (e3) and (f3) is satisfied.

12. A method of manufacturing the molded-then-torrefied biomass solid fuel according to claim 1, comprising:
molding the pulverized biomass particles into unheated biomass blocks, and
torrefying the unheated biomass blocks without performing a steam explosion to obtain a torrefied solid product, wherein the torrefied solid product is used as the biomass solid fuel; wherein
the torrefying temperature is 150° C. to 400° C., a raw material of the biomass comprises at least one selected from the group consisting of rubber tree, acacia, meranti, *eucalyptus*, teak, and a mixture of larch, spruce and birch, and
the molded-then-torrefied biomass solid fuel has fuel ratio (fixed carbon/volatile matter) of 0.15 to 1.50, dry-basis higher heating value of 4500 to 7000 (kcal/kg-dry), a molar ratio of oxygen O to carbon C (O/C) of 0.1 to 0.7, and a molar ratio of hydrogen H to carbon C (H/C) is 0.70 to 1.40.

13. The method of manufacturing a biomass solid fuel according to claim 12, wherein B/A=0.6 to 1 is satisfied, wherein A is a bulk density of the unheated biomass blocks and B is a bulk density of the heated solid product.

14. The method of manufacturing a biomass solid fuel according to claim 12, wherein H2/H1=1.1 to 4.0 is satisfied, wherein H1 is a HGI (Hardgrove grindability index) of the unheated biomass blocks and H2 is a HGI of the heated solid product.

* * * * *